United States Patent
Thiam et al.

(10) Patent No.: US 9,270,019 B2
(45) Date of Patent: *Feb. 23, 2016

(54) MULTIBAND MIMO VEHICULAR ANTENNA ASSEMBLIES WITH DSRC CAPABILITIES

(71) Applicant: Laird Technologies, Inc., Earth City, MO (US)

(72) Inventors: Cheikh T. Thiam, Grand Blanc, MI (US); Ayman Duzdar, Holly, MI (US); Hasan Yasin, Grand Blanc, MI (US); Melissa Carolina Lugo Brito, Clarkston, MI (US)

(73) Assignee: Laird Technologies, Inc., Earth City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/810,104

(22) Filed: Jul. 27, 2015

(65) Prior Publication Data

US 2015/0333392 A1 Nov. 19, 2015

Related U.S. Application Data

(63) Continuation of application No. 14/150,016, filed on Jan. 8, 2014, now Pat. No. 9,093,750.

(60) Provisional application No. 61/877,137, filed on Sep. 12, 2013.

(51) Int. Cl.
*H04Q 7/00* (2006.01)
*H01Q 1/32* (2006.01)
(Continued)

(52) U.S. Cl.
CPC ............ *H01Q 1/3275* (2013.01); *H01Q 1/523* (2013.01); *H01Q 9/0407* (2013.01); *H01Q 21/30* (2013.01);
(Continued)

(58) Field of Classification Search
USPC .......................................... 455/41.2; 343/713
See application file for complete search history.

(56) References Cited

U.S. PATENT DOCUMENTS 6,054,961 A * 4/2000 Gong ................... H01Q 1/1271
343/713
7,411,554 B2 8/2008 Jung et al.
(Continued)

FOREIGN PATENT DOCUMENTS

DE 102012215734 3/2014
EP 1619752 1/2006
(Continued)

OTHER PUBLICATIONS

International Search Report and Written Opinion dated Nov. 27, 2014 from PCT International App. No. PCT/US2014/055085 filed Sep. 11, 2014 which claimspriority to the same parent application as the instant application; 10 pages.

(Continued)

*Primary Examiner* — Duc C Ho
(74) *Attorney, Agent, or Firm* — Harness, Dickey & Pierce, P.L.C.

(57) ABSTRACT

Disclosed are exemplary embodiments of multiband multiple input multiple output (MIMO) vehicular antenna assemblies for installation to a vehicle body wall. In exemplary embodiments, a multiband MIMO vehicular antenna assembly generally includes at least one cellular antenna configured to be operable over one or more cellular frequencies (e.g., Long Term Evolution (LTE), etc.), at least one satellite antenna configured to be operable over one or more satellite frequencies (e.g., Global Navigation Satellite System (GNSS), satellite digital audio radio services (SDARS), etc.) and at least one Dedicated Short Range Communication (DSRC) antenna configured to be operable over DSRC frequencies.

23 Claims, 20 Drawing Sheets

(51) Int. Cl.
*H01Q 1/52* (2006.01)
*H01Q 21/30* (2006.01)
*H04W 40/02* (2009.01)
*H04L 5/08* (2006.01)
*H04W 4/00* (2009.01)
*H04B 7/04* (2006.01)
*H01Q 9/04* (2006.01)
*H01Q 9/30* (2006.01)

(52) U.S. Cl.
CPC ............... *H04B 7/0413* (2013.01); *H04L 5/08* (2013.01); *H04W 4/008* (2013.01); *H04W 40/02* (2013.01); *H01Q 9/30* (2013.01)

(56) References Cited

U.S. PATENT DOCUMENTS

| | | | |
|---|---|---|---|
| 7,609,203 B2 | 10/2009 | Dockemeyer, Jr. et al. | |
| 8,045,592 B2 | 10/2011 | Combi et al. | |
| 8,078,390 B2 | 12/2011 | Menzel et al. | |
| 8,280,307 B2 | 10/2012 | Talty et al. | |
| 8,569,444 B2 | 10/2013 | Nakamoto et al. | |
| 8,688,376 B2 | 4/2014 | Stahlin et al. | |
| 8,750,944 B2 | 6/2014 | Rousu et al. | |
| 8,995,956 B2* | 3/2015 | Lavi | H04W 84/22 343/711 |
| 9,093,750 B2* | 7/2015 | Thiam | H01Q 1/3275 |
| 2003/0076264 A1* | 4/2003 | Yuanzhu | H01Q 1/38 343/700 MS |
| 2009/0305746 A1 | 12/2009 | Pursche et al. | |
| 2010/0060531 A1 | 3/2010 | Rappaport | |
| 2010/0234071 A1 | 9/2010 | Shabtay et al. | |
| 2011/0140975 A1* | 6/2011 | Shigetomi | H01Q 1/3291 343/713 |
| 2012/0013519 A1 | 1/2012 | Hakansson et al. | |
| 2012/0057588 A1 | 3/2012 | Duzdar et al. | |
| 2012/0239294 A1* | 9/2012 | Stahlin | H04L 67/12 701/484 |
| 2013/0069842 A1 | 3/2013 | Lee et al. | |
| 2013/0078945 A1 | 3/2013 | Lavi et al. | |
| 2015/0103859 A1* | 4/2015 | Breeze | G01R 33/343 372/82 |

FOREIGN PATENT DOCUMENTS

| | | |
|---|---|---|
| EP | 2211310 | 7/2010 |
| EP | 2235690 | 10/2010 |
| KR | 100794788 | 1/2008 |
| KR | 101144421 | 5/2012 |
| WO | 2013090783 | 6/2013 |

OTHER PUBLICATIONS

"Integrating V2V Functionality at 5.9 GHz Into an Existing Quad-Band Antenna for Automotive Applications", A. Duzdar and C. Thiam, Nov. 2, 2011; 9 pgs.
"spark.qualcomm.com/blog/let-your-car-do-talking"; internet accessed Dec. 23, 2013; 2 pgs.
www.auto-talks.com; internet accessed Dec. 23, 2013; 7 pgs.
www.nxp.com/campaigns/connected-mobility/; internet accessed Dec. 23, 2013; 25 pgs.

* cited by examiner

MULTIBAND MIMO VEHICULAR ANTENNA ASSEMBLIES WITH DSRC CAPABILITIES

CROSS-REFERENCE TO RELATED APPLICATIONS

This application is a continuation of U.S. patent application Ser. No. 14/150,016 filed Jan. 8, 2014, which, in turn, claimed the benefit of U.S. Provisional Application No. 61/877,137 filed Sep. 12, 2013. The entire disclosures of the above applications are incorporated herein by reference.

FIELD

The present disclosure generally relates to multiband vehicular antenna assemblies.

BACKGROUND

This section provides background information related to the present disclosure which is not necessarily prior art.

Various different types of antennas are used in the automotive industry, including AM/FM radio antennas, satellite digital audio radio service antenna, global positioning system antennas, cell phone antennas, etc. Multiband antenna assemblies are also commonly used in the automotive industry. A multiband antenna assembly typically includes multiple antennas to cover and operate at multiple frequency ranges. A printed circuit board (PCB) having radiating antenna elements is a typical component of the multiband antenna assembly.

Automotive antennas may be installed or mounted on a vehicle surface, such as the roof, trunk, or hood of the vehicle to help ensure that the antennas have unobstructed views overhead or toward the zenith. The antenna may be connected (e.g., via a coaxial cable, etc.) to one or more electronic devices (e.g., a radio receiver, a touchscreen display, navigation device, cellular phone, etc.) inside the passenger compartment of the vehicle, such that the multiband antenna assembly is operable for transmitting and/or receiving signals to/from the electronic device(s) inside the vehicle.

SUMMARY

This section provides a general summary of the disclosure, and is not a comprehensive disclosure of its full scope or all of its features.

According to various aspects, exemplary embodiments are disclosed of multiband multiple input multiple output (MIMO) vehicular antenna assemblies for installation to a vehicle body wall. In exemplary embodiments, a multiband MIMO vehicular antenna assembly generally includes at least one cellular antenna configured to be operable over one or more cellular frequencies (e.g., Long Term Evolution (LTE), etc.), at least one satellite antenna configured to be operable over one or more satellite frequencies (e.g., Global Navigation Satellite System (GNSS), satellite digital audio radio services (SDARS), etc.) and at least one Dedicated Short Range Communication (DSRC) antenna configured to be operable over DSRC frequencies.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
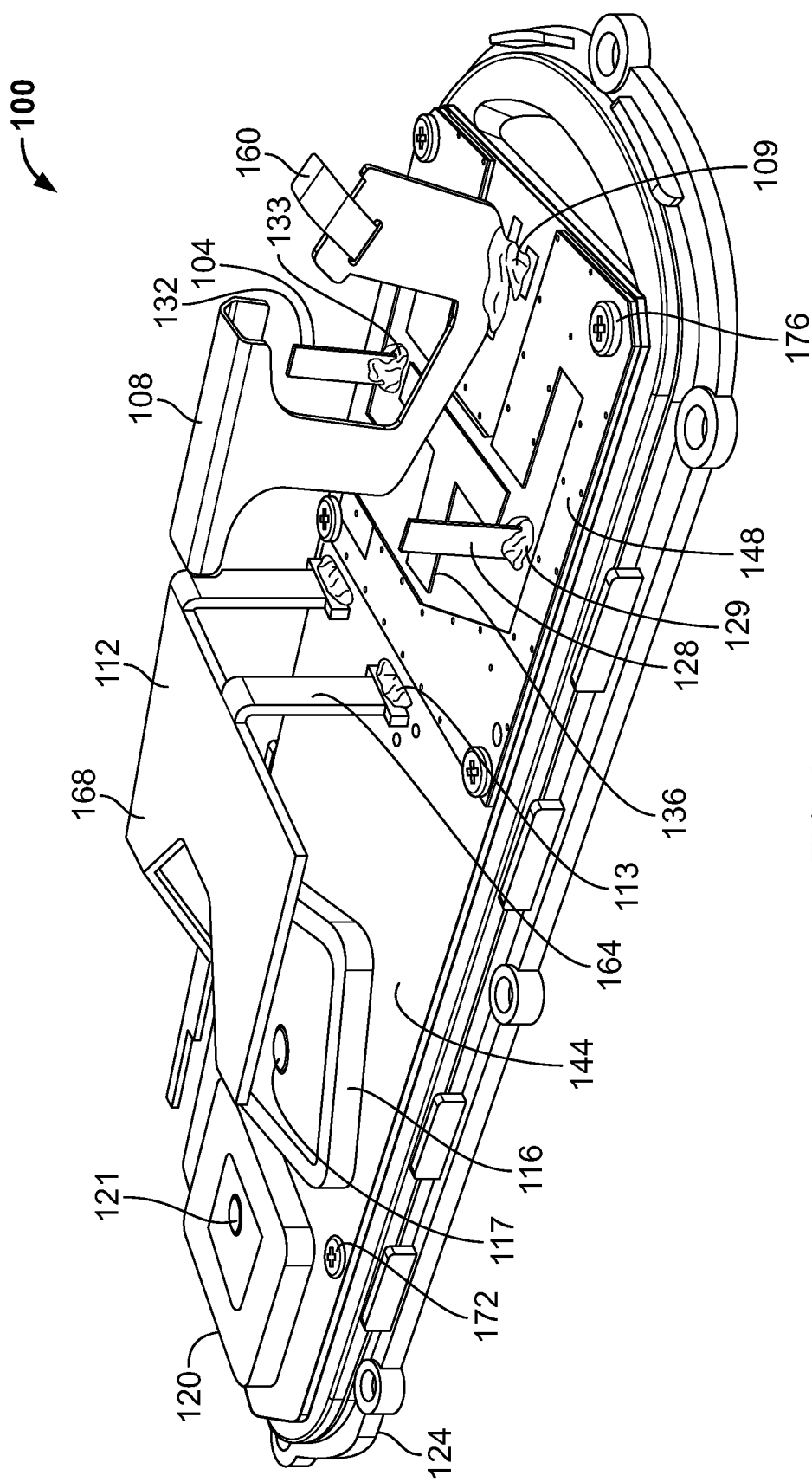
FIG. 1 is a perspective view of a multiband MIMO (Multiple Input Multiple Output) antenna assembly with DSRC (Dedicated Short Range Communication) capabilities, where the antenna assembly includes DSRC, cellular, and satellite antennas according to an exemplary embodiment.
Figure 2:
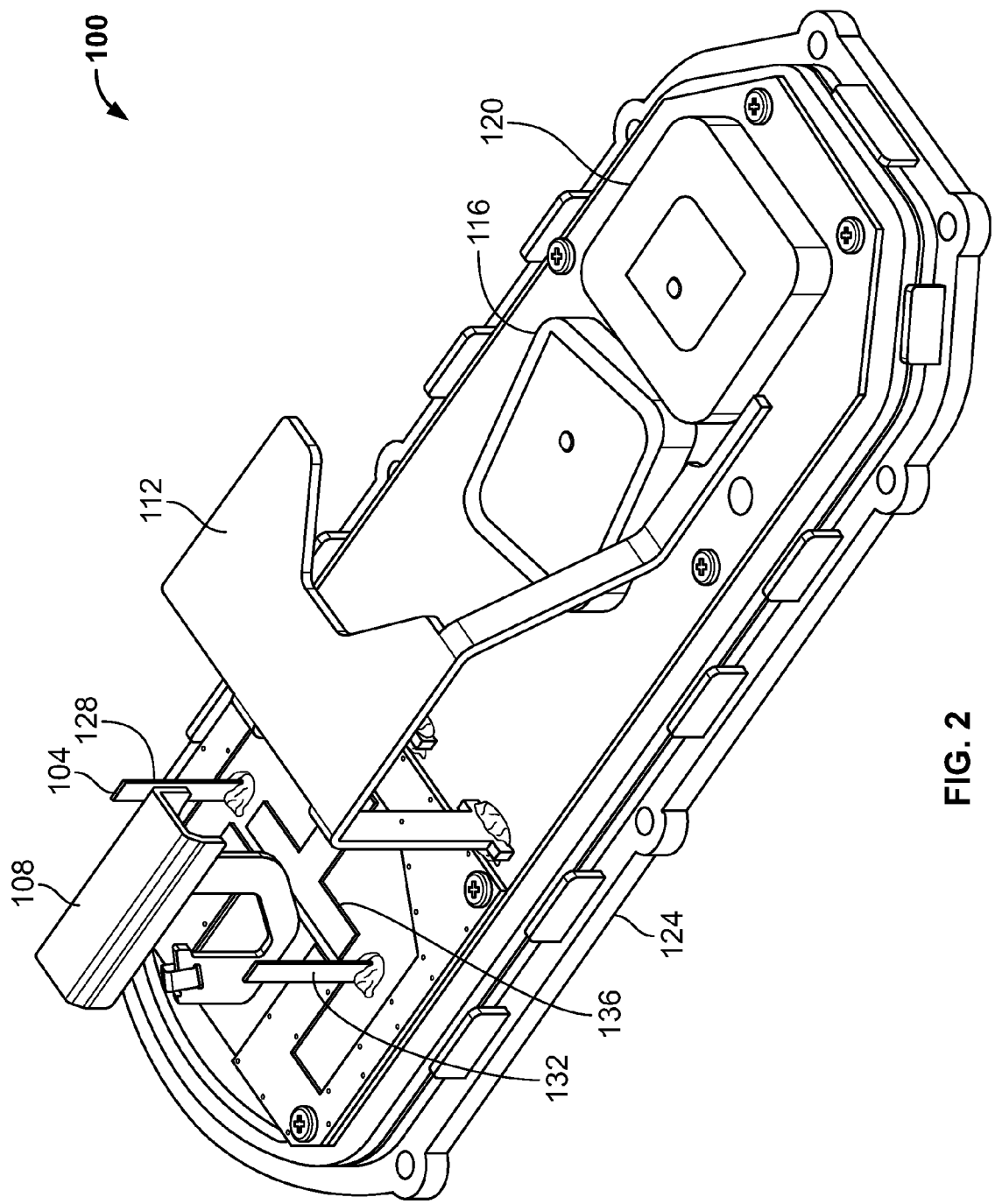
FIG. 2 is a perspective view of the opposite side of the antenna assembly shown in FIG. 1.
Figure 3:
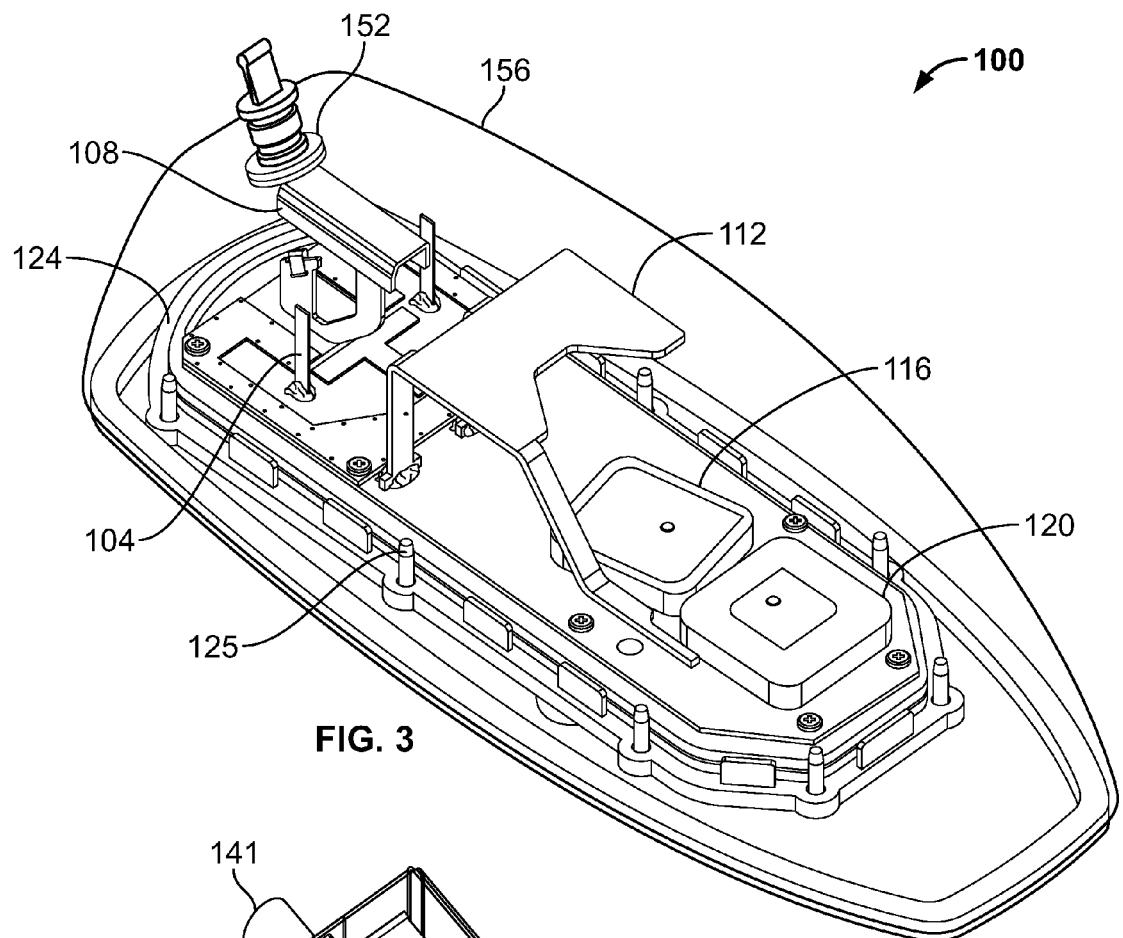
FIG. 3 is a perspective view of the antenna assembly shown in FIGS. 1 and 2 with a radome installed, where the radome is shown transparent in order to show the components underneath the radome.
Figure 12:
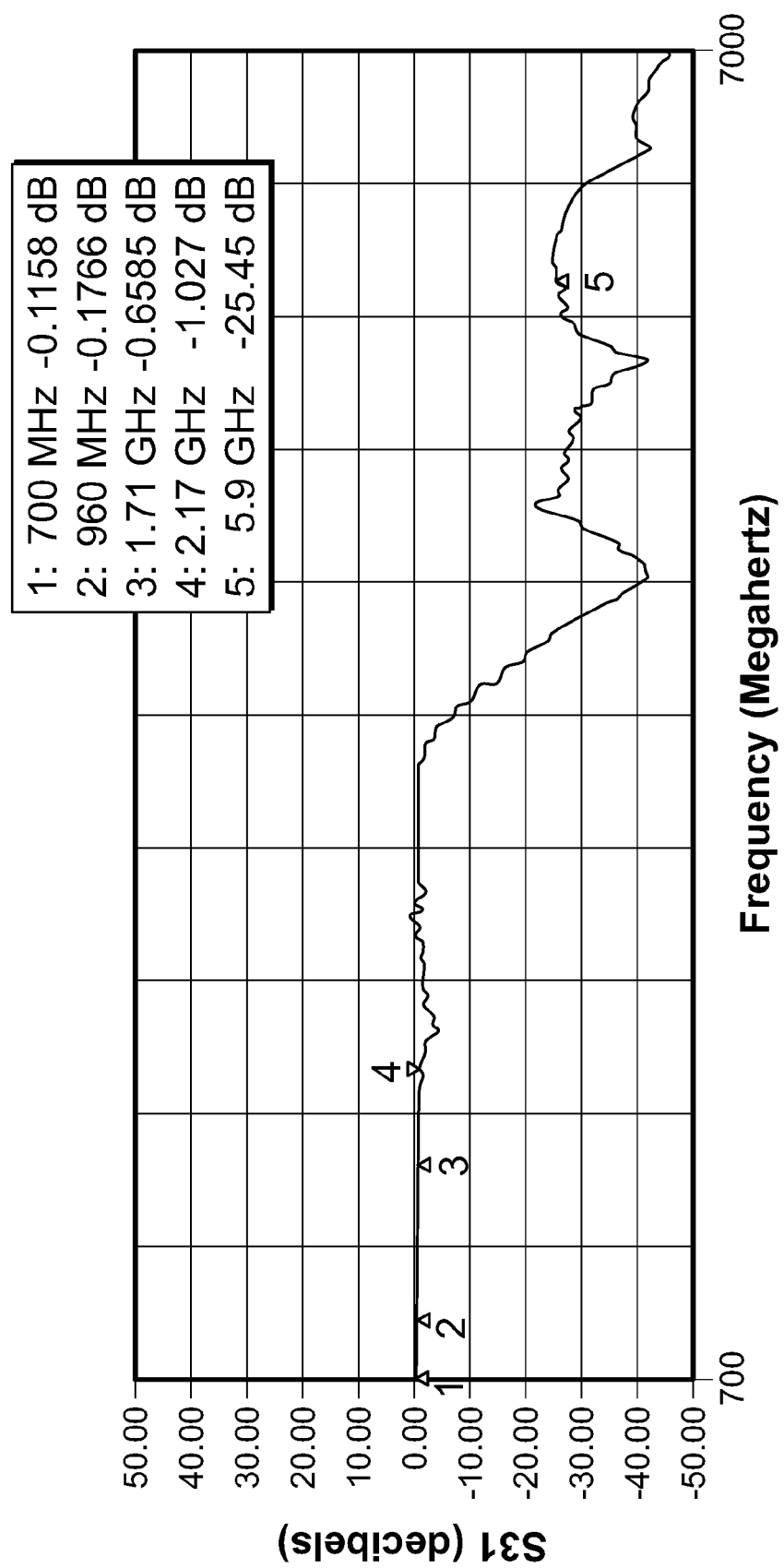
Figure 13:
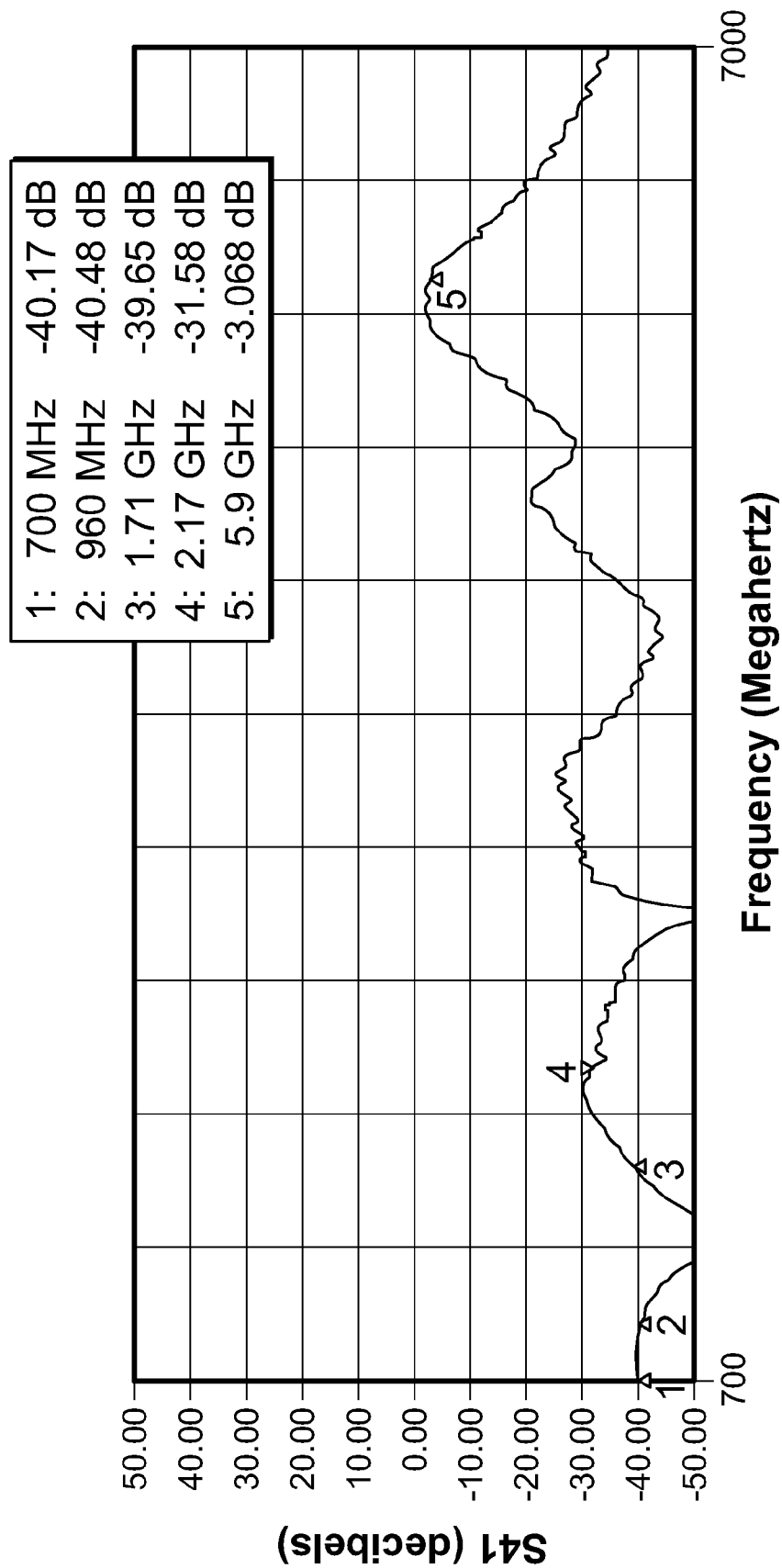
Figure 17:
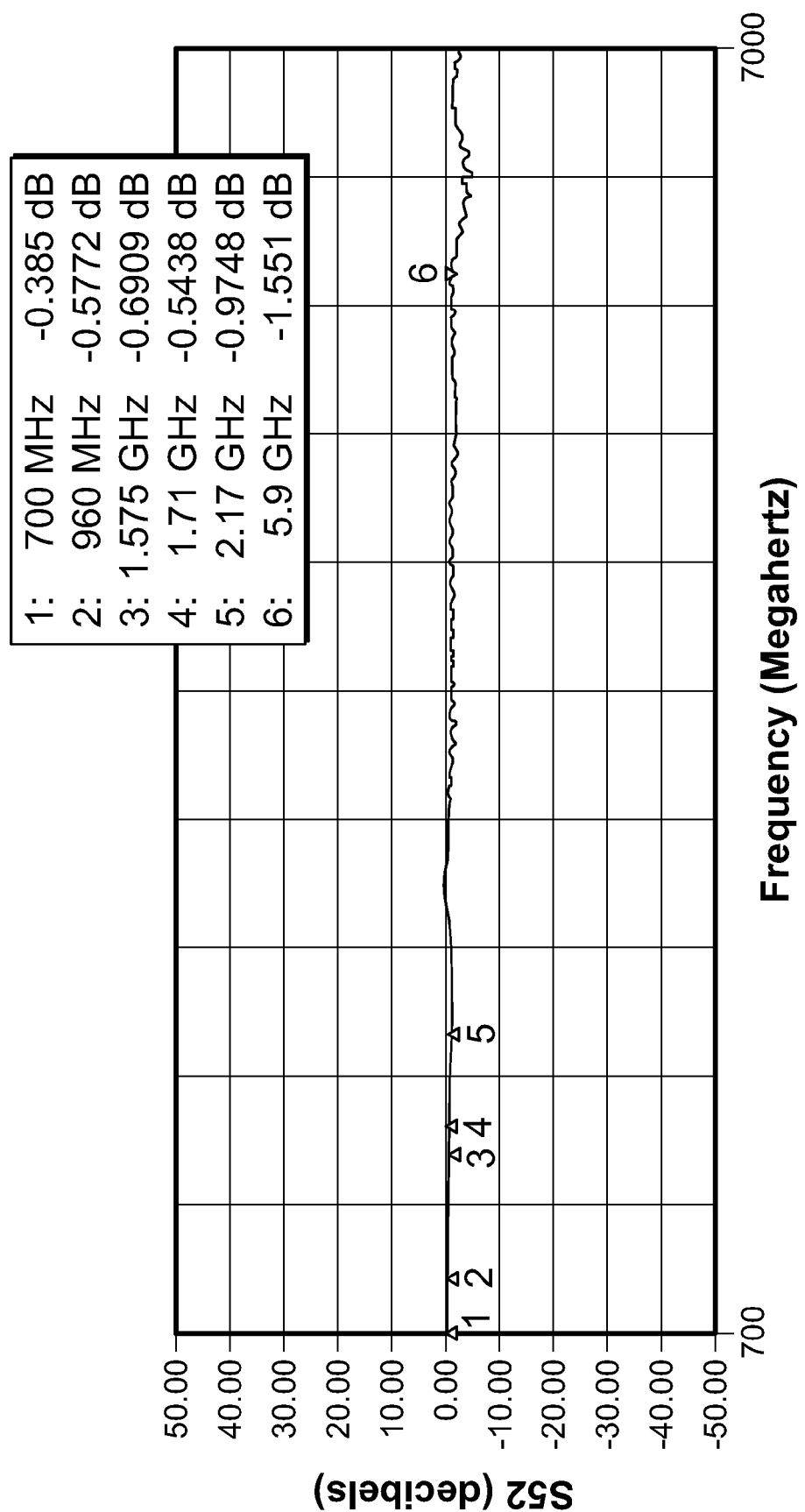
Figure 21:
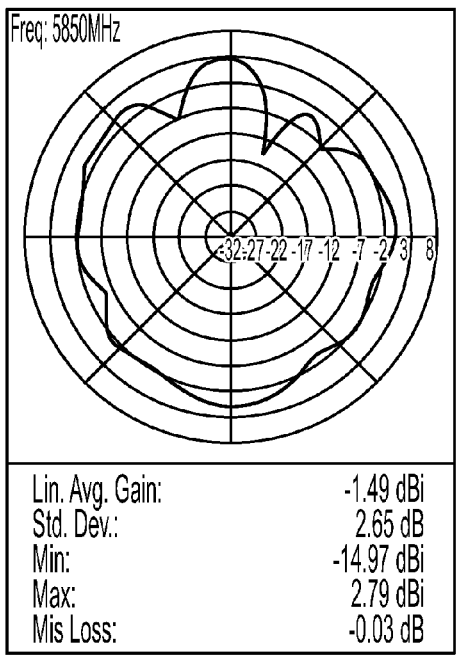
Figure 21:
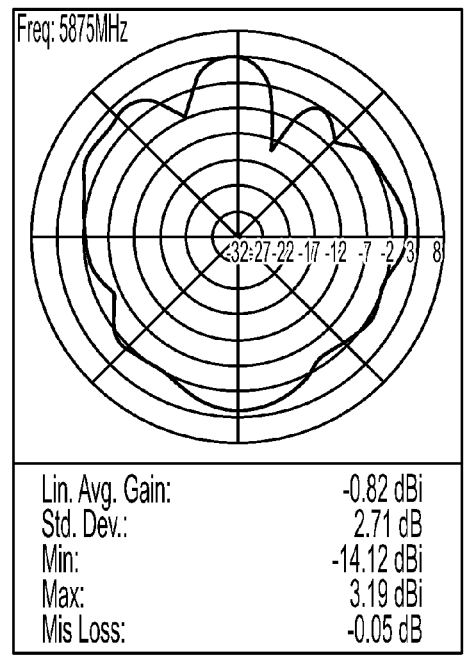
Figure 21:
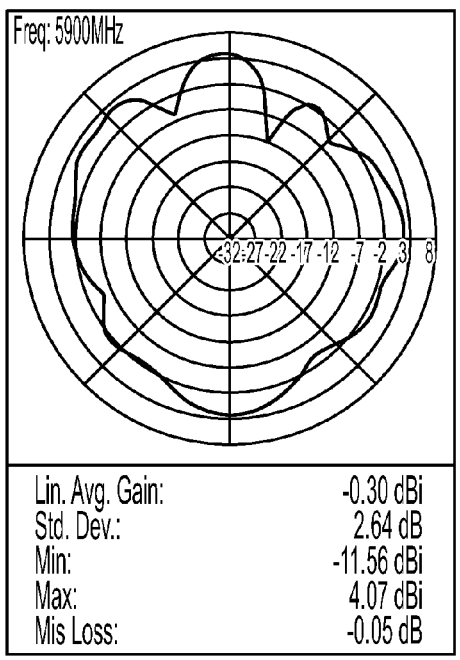
Figure 21:
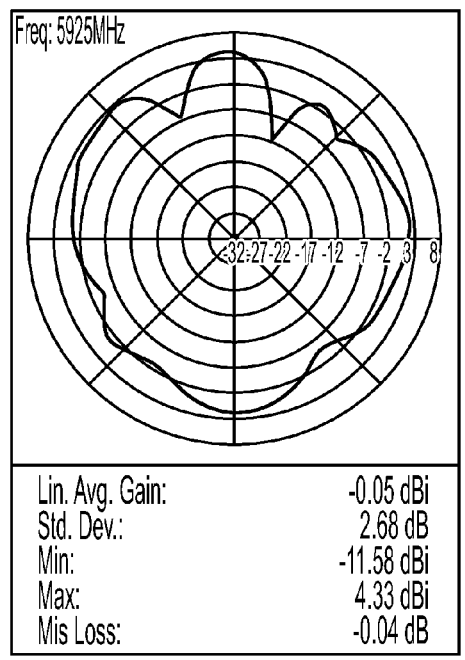

FIGS. 6, 7, 8, 9, and 10 are line graphs of measured reflection or matching S11, S22, S33, S44, and S55 in decibels versus frequency in megahertz for a prototype of the example antenna assembly and coupler box as shown in FIGS. 1 through 5;

FIGS. 11, 14, 15, 16, 18, 19, and 20 are line graphs of measured isolation S21, S51, S32, S42, S34, S35, and S45, respectively, in decibels versus frequency in megahertz (MHz) for the prototype of the example antenna assembly and coupler box as shown in FIGS. 1 through 5;

FIGS. 12, 13, and 17 are line graphs of measured insertion loss S31, S41, and S52, respectively, in decibels versus frequency in megahertz for the prototype of the example antenna assembly and coupler box as shown in FIGS. 1 through 5; and FIG. 21 illustrates antenna gain at the end of a pigtail of a prototype of the example antenna assembly shown in FIGS. 1 through 3 on a one-meter diameter generally circular ground plane at DSRC frequencies of 5850 MHz, 5875 MHz, 5900 MHz, and 5925 MHz.

Corresponding reference numerals indicate corresponding parts throughout the several views of the drawings.

DETAILED DESCRIPTION

Example embodiments will now be described more fully with reference to the accompanying drawings.

The inventors hereof recognized a need for more integration with low correlation in multiband antenna automotive systems that include multiple antennas. Accordingly, the inventors have disclosed herein exemplary embodiments of multiband MIMO antenna assemblies of systems that include DSRC, cellular, and satellite antennas. In such exemplary embodiments, a DSRC solution may be integrated or included in a multiband antenna assembly to provide a user with more versatility in communication.

As disclosed herein, DSRC functionality may be added, integrated, or retrofit into an existing, production-ready multiband antenna assembly and/or a multiband MIMO antenna assembly as disclosed in PCT application WO 2013/090783. The entire contents of PCT application WO 2013/090783 is incorporated herein by reference. Exemplary embodiments are disclosed of multiband MIMO vehicular antenna assemblies that are operable over DSRC frequencies and one or more other frequencies associated with cellular communications (e.g., Long Term Evolution (LTE), etc.), Wi-Fi, satellite signals (e.g., Satellite Digital Audio Radio (SDARS), Global Navigation Satellite System (GNSS), etc.) and/or terrestrial signals (e.g., amplitude modulation (AM), frequency modulation (FM), etc.).

The DSRC antenna output may be on the same, existing transmission or communication lines or links (e.g., cables, etc.) as one or more other antenna outputs. For example, some exemplary embodiments may include diplexing of the DSRC signals with LTE signals. The DSRC may be implemented so as to avoid (or at least reduce) any interference and/or degradation with the existing antenna module and its cellular antennas.

The DSRC capabilities are preferably implemented in the multiband MIMO antenna assembly without altering existing LTE MIMO performance and/or without increasing the overall size of the existing assembly. In exemplary embodiments, a dual monopole antenna is used so as to provide an array effect for omnidirectionality in the pattern. The dual monopole antenna is combined and fed through the primary cellular output via coupling (e.g., capacitive or parasitic coupling or galvanic coupling) to eliminate (or at least reduce) interference with the cellular output impedance. On the cellular path, a DSRC stub or isolator is located to provide isolation between the cellular and DSRC antennas elements. A multiplexer or coupler box (e.g., FIG. 4, etc.) is provided to allow use of DSRC as an option for users.

In some exemplary embodiments, the antenna assembly includes a first or lower circuit board and a second or upper circuit board. The second circuit board may be positioned above or on top of the first circuit board. The satellite antennas (e.g., GNSS, SDARS, etc.) and cellular antennas (e.g., primary and secondary LTE cellular antennas, etc.) may be coupled to and/or supported by the first circuit board. The DSRC antenna elements and isolator may be coupled to and/ or supported by the second circuit board. The first circuit board may comprise FR4 glass-reinforced epoxy laminate, which tends to be very lossy at high frequencies. The second circuit board may comprise a material more compatible with high frequencies, such as the 5.9 MHz band associated with DSRC, etc. In exemplary embodiments, the second circuit board is less lossy or has a lower loss tangent at DSRC frequencies than the first circuit board. By way of example, the second circuit board may comprise a woven fiberglass polytetrafluoroethylene (PTFE) composite material or any low-loss tangent high frequency substrate. In one exemplary embodiment, the second circuit board comprises Arlon Diclad 880 PTFE/woven fiberglass laminate, which has a low fiberglass/PTFE ratio, low dielectric constant and dissipation factor, and a relative permittivity of 2.17 or 2.20. In another exemplary embodiment, the second circuit board comprises TLP-5-0310-CLH/CLH woven matrix of fiberglass fabric coated with PTFE from Taconic, which has a low dielectric constant of about 2.2. Important parameters to consider when selecting the material(s) for the second circuit board include the stability of the dielectric constant and loss tangent of the material.

In some exemplary embodiments, a "radio" unit for DSRC is added to the antenna assembly. The radio unit includes an Rx/Tx module (a radio frequency (RF) tuner), base band processor (BB processor), a microcontroller, and an output system (e.g., universal serial bus (USB), controller area network (CAN) bus, Ethernet, or any other suitable kind of (vehicle) output system, etc.).

With reference now to the drawings, FIGS. 1 through 3 illustrate an example embodiment of an antenna assembly 100 including at least one or more aspects of the present disclosure. As shown, the antenna assembly 100 includes multiple antennas 104, 108, 112, 116, 120 supported by and/ or coupled to (e.g., co-located on, etc.) a chassis 124 (or base) as disclosed herein. More specifically, the antenna assembly 100 includes a DSRC antenna 104, a first or primary cellular antenna 108, a second or secondary cellular antenna 112, a first patch antenna 116, and a second patch antenna 120.

Figure 4:
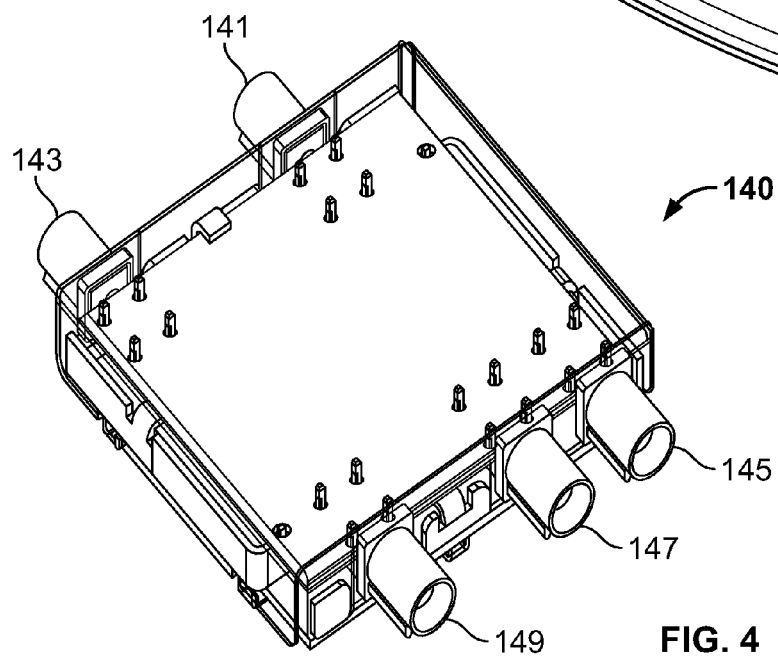
FIG. 4 is a perspective view of a multiplexer or coupler box for DSRC, cellular, and GNSS (Global Navigation Satellite System) according to an exemplary embodiment.
Figure 5:
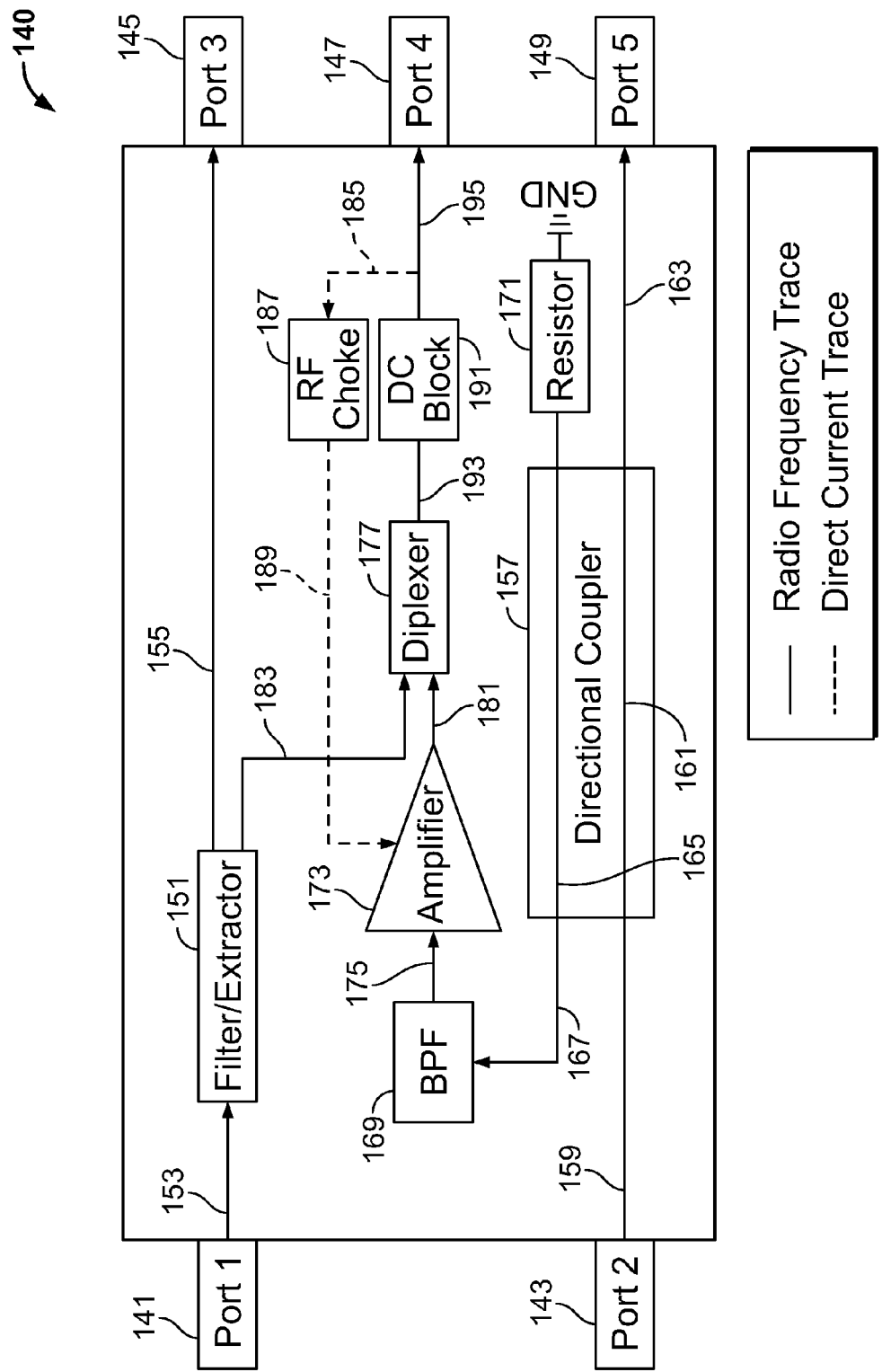
FIG. 5 is a block diagram showing the components of the DSRC/cellular/GNSS multiplexer or coupler box shown in FIG. 4 according to an exemplary embodiment.

In this example, the DSRC antenna 104 comprises a dual monopole antenna having two antenna elements 128, 132. The antenna elements 128, 132 are spaced apart from each other and disposed along opposite sides of the primary cellular antenna 108, whereby the antenna elements 128, 132 provide an array effect for omnidirectionality in the pattern. A stub or isolator 136 (e.g., a generally T-shaped circuit board trace, etc.) is located to provide isolation between the DSRC antennas elements 128, 132 and the primary cellular antenna 108. As shown in FIG. 1, the isolator 136 is located generally underneath a portion of the primary cellular antenna 108. The DSRC antenna elements 128, 132 are on opposite sides of the isolator 136. The output of the DSRC antenna 104 is combined and fed through the primary cellular output via coupling to eliminate (or at least reduce) interference with the cellular output impedance. The antenna assembly 100 also includes a multiplexer or coupler box 140 as shown in FIGS. 4 and 5. The multiplexer 140 will be located near or adjacent the Telematics Control Unit (TCU).

With continued reference to FIGS. 1 through 3, the antenna assembly 100 includes a first or lower circuit board or substrate 144. The antenna assembly 100 also includes a second or upper circuit board or substrate 148. The second circuit board 148 is positioned above or on top of a rearward or back portion of the first circuit board 144. The cellular antennas 108, 112 and patch antennas 116, 120 are coupled to and/or supported by (e.g., soldered to, etc.) the first circuit board 144. The first and second patch antennas 116, 120 include respective connectors 117, 121 (e.g., feed pin, interlayer connector, etc.) extending therethrough which may be soldered, etc. to the PCB 144. In this example, the patch antennas 116, 120 are located adjacent or side-by-side in the front portion of the antenna assembly 100. Alternatively, the patch antennas 116, 120 may be positioned at other locations, e.g., stacked on top of each other, etc.

The DSRC antenna 104 (e.g., DSRC elements 128, 132, isolator 136, etc.) is coupled to and/or supported by the second circuit board 148. For example, the isolator 136 may comprise an electrically conductive trace (broadly, an electrical conductor) along the second circuit board 148. The DSRC antenna elements 128, 132 may be soldered 129, 133 to a portion of the second circuit board 148 for electrical connection to a feed network.

In this example, the first circuit board 144 may comprise FR4 glass-reinforced epoxy laminate, which tends to be very lossy at high frequencies. The second circuit board 148 may comprise a material more compatible with high frequencies, such as the 5.9 MHz band associated with DSRC, etc. By way of example, the second circuit board 148 may comprise a woven fiberglass polytetrafluoroethylene (PTFE) composite material or any low-loss tangent high frequency substrate. In one exemplary embodiment, the second circuit board 148 comprises Arlon Diclad 880 PTFE/woven fiberglass laminate, which has a low fiberglass/PTFE ratio, low dielectric constant and dissipation factor, and a relative permittivity of 2.17 or 2.20. In another exemplary embodiment, the second circuit board 148 comprises TLP-5-0310-CLH/CLH woven matrix of fiberglass fabric coated with PTFE from Taconic, which has a low dielectric constant of about 2.2.

In some exemplary embodiments, a "radio" unit for DSRC is added to the antenna assembly 100. The radio unit preferably includes an Rx/Tx module (a radio frequency (RF) tuner), base band processor (BB processor), a microcontroller, and an output system (e.g., universal serial bus (USB), controller area network (CAN) bus, Ethernet, or any other suitable kind of (vehicle) output system, etc.). The radio unity layout may be provided on the top PCB board or second circuit board 148. By way of example only, exemplary embodiments may include a DSRC receiver chipset from Autotalks, NXP, or Qualcomm Atheros.

The first or primary cellular antenna 108 is configured to be operable for both receiving and transmitting communication signals within one or more cellular frequency bands (e.g., Long Term Evolution (LTE), etc.). In addition, the first cellular antenna 108 may also be configured to be operable with the amplitude modulation (AM) band and the frequency modulation (FM) band and/or to be connected with an AM/FM antenna mast via an opening 152 in the radome 156 (FIG. 3) and electrical contact clip 160 (FIG. 1). Alternative embodiments may include a first cellular antenna that is configured differently, e.g., a stamped metal wide band monopole antenna mast, etc.

The second or secondary cellular antenna 112 is configured to be operable for receiving (but not transmitting) communication signals within one or more cellular frequency bands (e.g., LTE, etc.). The second cellular antenna 112 may be supported and held in position by a support, which may comprise plastic or other dielectric material. The second cellular antenna 112 includes downwardly extending portions, legs, or shorts 164 generally perpendicular to a planar surface 168 of the second cellular antenna 112. The legs 164 are configured to be slotted or extend into holes in the first or lower circuit board 144 for connection (e.g., solder, etc.) to a feed network. Alternative embodiments may include a second cellular antenna that is configured differently (e.g., inverted L antenna (ILA), planar inverted F antenna (PIFA), etc.).

The first and second patch antennas 116 and 120 may be configured to be operable for receiving satellite signals. In this illustrated embodiment, the first patch antenna 116 is configured to be operable for receiving GNSS signals. The second patch antenna 120 is configured to be operable for receiving SDARS signals (e.g., Sirius XM, Telematics Control Unit (TCU), etc.). In exemplary embodiments, the SDARS signals may be fed via a coaxial cable to the SDARS radio, which, in turn, may be located in an Instrument Panel (IP) that is independent of the TCU and DSRC receiver boxes.

FIGS. 4 and 5 illustrate an exemplary multiplexer or coupler box 140 that may be used with the antenna assembly 100. As shown, the multiplexer 140 includes five ports 141, 143, 145, 147, and 149.

In operation, the first port or input 141 may receive DSRC signals from the DSRC antenna 104 and cellular signals (e.g., LTE, etc.) from the primary cellular antenna 108 (Tx/Rx). Accordingly, the DSRC antenna 104 output may be on the same transmission or communication line or link (e.g., a single coaxial cable connected to the first port 141, etc.) as the output of the primary cellular antenna 108, such that there is diplexing of the DSRC signals with the cellular signals. The second port or input 143 may receive satellite (e.g., GNSS, etc.) signals from the first patch antenna 116 and cellular signals (e.g., LTE, etc.) from the secondary cellular antenna 112 (Rx only).

The third port or output 145 may output cellular signals from the primary cellular antenna 108 (Tx/Rx), e.g., to a Telematics Control Unit (TCU) box. The fourth port or output 147 may output DSRC signals and satellite (e.g., GNSS, etc.) signals, e.g., to a DSRC box, etc. Accordingly, the DSRC signals and GNSS signals in this example may be output on the same transmission or communication line or link (e.g., a single coaxial cable connected to the fourth port 147, etc.), such that there is diplexing of the DSRC signals and GNSS signals. The fifth port or output 149 may output satellite (e.g., GNSS, etc.) signals and cellular signals from the respective patch antenna 116 and second cellular antenna 112 (Rx only), e.g., to a Telematics Control Unit (TCU) box, etc.

In addition to the five ports 141 through 149, the multiplexer or coupler box 140 also includes various electronic components, circuitry, radio frequency traces and direct current traces. More specifically, an extractor filter 151 is generally between the first port 141 and the third and fourth ports 145, 147. The extractor filter 151 receives via trace 153 DSRC signals and cellular signals that are respectively received by or at the first port 141 from the respective DSRC antenna 104 and primary cellular antenna 108 (Tx/Rx). The extractor filter 151 is operable for separating or extracting DSRC signals from cellular signals.

After the filter 151, the cellular signals are transmitted or travel along trace 155 to the third port 145. The third port 145 outputs the cellular signals onto a communication link or line (e.g., a single coaxial cable, etc.). The communication link or line may be routed from the third port or output 145 to an external device, such as a vehicle console or a Telematics Control Unit (TCU) box onboard a vehicle.

A directional coupler 157 is generally between the second port 143 and the fourth and fifth ports 147, 149. During operation, the directional coupler 157 receives via trace 159 satellite signals and cellular signals that are respectively received by or at the second port 143 from the respective first patch antenna 116 and secondary cellular antenna 112 (Rx only). The satellite and cellular signals are transmitted from the directional coupler 157 (e.g., via a first transmission line 161 of the directional coupler 157 and trace 163, etc.) to the fifth port 149. The fifth port 149 outputs the satellite and cellular signals onto a communication link or line (e.g., a single coaxial cable, etc.), which is routed from the fifth port 149 to an external device, such as a vehicle console or a Telematics Control Unit (TCU) box onboard a vehicle.

The satellite and cellular signals received by the directional coupler 157 are also transmitted therefrom (e.g., via a second transmission line 165 of the directional coupler 157 and trace 167, etc.) to a bandpass filter 169. The second transmission line 165 of the directional coupler 157 is coupled to ground via a resistor 171 (e.g., 50 ohm resistor, etc.). The first and second transmission lines 161 and 165 of the directional coupler 157 may comprise circuit board traces.

The bandpass filter 169 permits satellite signals to pass the filter 169 and travel to an amplifier 173 via trace 175. But the bandpass filter 169 prevents cellular signals from passing to the filter 169.

After the bandpass filter 169, the satellite signals are transmitted or travel along trace 181 to the diplexer 177. The diplexer 177 also receives the DSRC signals from the extractor filter 151 via trace 183. The diplexer 177 is operable for implementing frequency domain multiplexing such that the first and second ports 141, 143 are multiplexed onto the fourth port 147. The DSRC signals and satellite signals (e.g., GNSS signals, etc.) occupy disjoint frequency bands, such that the DSRC signals on the first port 141 and the satellite signals on the second port 143 can coexist on the fourth port 147 without interfering with each other. In operation, satellite and DSRC signals travel from the diplexer 177 to the fourth port 147 via traces 193 and 195. Accordingly, this exemplary embodiment includes the diplexing of DSRC signals with GNSS signals.

Other exemplary embodiments may include diplexing of the DSRC signals with LTE signals. In either case, the DSRC may be implemented so as to avoid (or at least reduce) any interference and/or degradation with the existing antenna module.

In addition to the functionality and operation described above, the third port 145 may also be used for sense resistor phantom power to the antenna assembly 100. The fourth port 147 may also be used for DC phantom power input (e.g., 5V at 25 mA max, etc.) to the amplifier 173 (e.g., 12 decibel amplifier, etc.) via DC trace 185, RF choke 187, and DC trace 189. The RF choke 187 is operable for eliminating noise, e.g., by blocking higher frequency alternating current while allowing lower frequency or DC current to pass. A DC block 191 prevents the flow of audio and direct current back to the diplexer 177 via traces 193 and 195, while also offering minimum or little interference to the signals passing therethrough from the diplexer 177 to the fourth port 147. In this example, the power (e.g., DC power, etc.) for operating the antenna assembly 100 and/or multiplexer 140 may thus be provided by the DSRC box ("DC Phantom Power") and/or Telematics Control Unit (TCU) box ("Sense Resistor Phantom Power"). The power may be provided via the same transmission or communication lines or links (e.g., coaxial cables, etc.) that are routed from the third and fourth ports 145 and 147 to carry cellular signals to the Telematics Control Unit (TCU) box and to carry the combined DSRC/GNSS signals to the DSRC box, respectively. Alternatively, power could be provided by other means besides the DSRC box and Telematics Control Unit (TCU) box, such as the car's electrical system directly, etc.

With reference back to FIGS. 1 through 3, the first and second cellular antennas 108, 112 are connected to and supported by the first circuit board 144 by, for example, soldering 109, 113, etc. The first cellular antenna 108 may have one or more bent or formed tabs at the bottom, which may provide areas for soldering the first cellular antenna 108 to the first circuit board 144. The first cellular antenna 108 may also include a downwardly extending projection that may be at least partially received within a corresponding opening in the first circuit board 144, for example, to make electrical connection to a component on the opposite side of the first circuit board 144. Alternatively, other embodiments may include other means for soldering or connecting the first cellular antenna 108 to the first circuit board 144.

The first circuit board 144 is supported by the chassis, base, or body 124. In this example embodiment, a front or forward portion of the first circuit board 144 is mechanically fastened via fasteners 172 (e.g., screws, etc.) to the chassis 124. The back or rearward portion of the first circuit board 144 is mechanically fastened via fasteners 176 (e.g., screws, etc.) to the chassis 124. The fasteners 176 also mechanically fasten the second circuit board 148 to the first circuit board 144.

Figure 9:
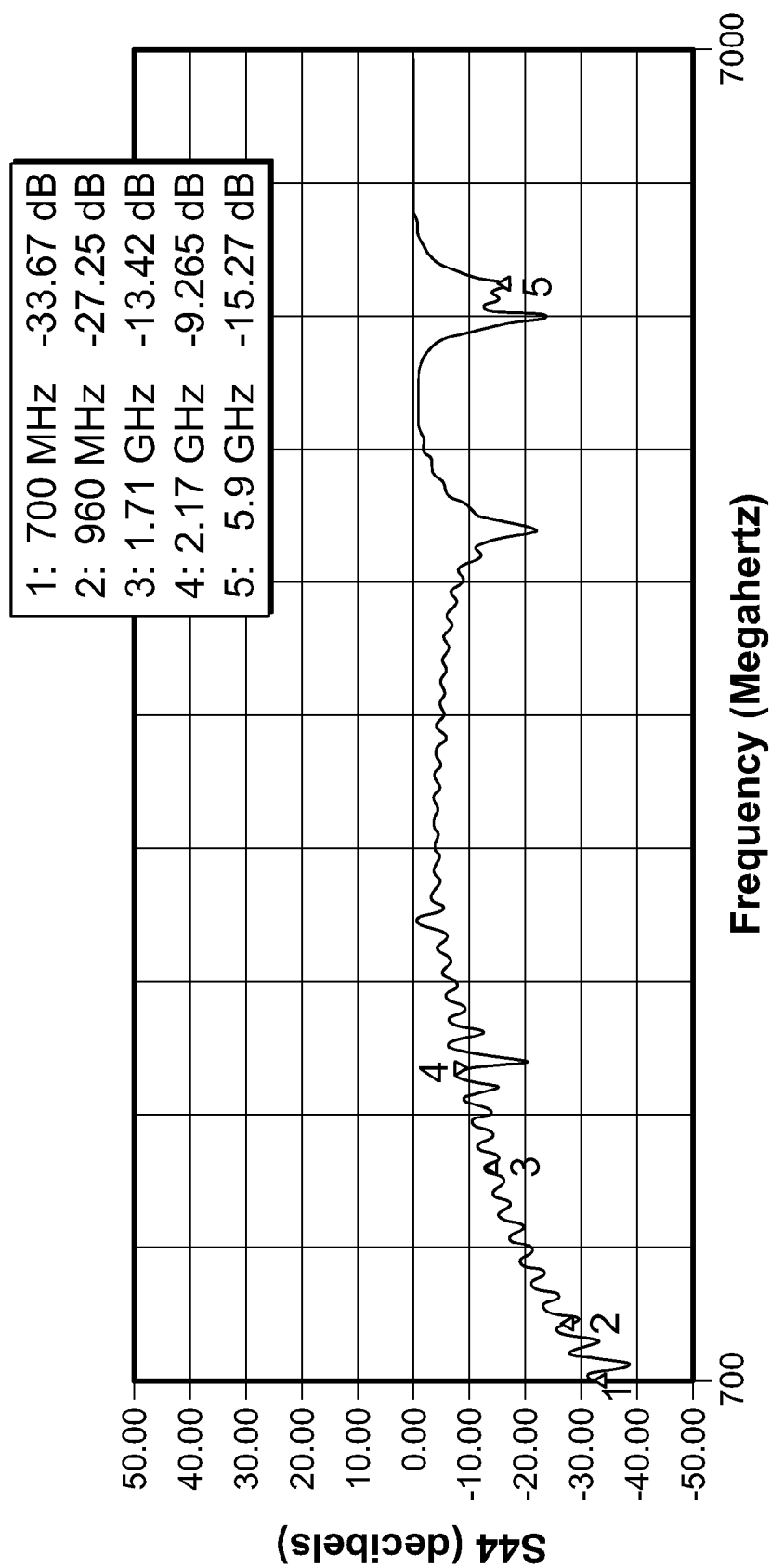
Figure 10:
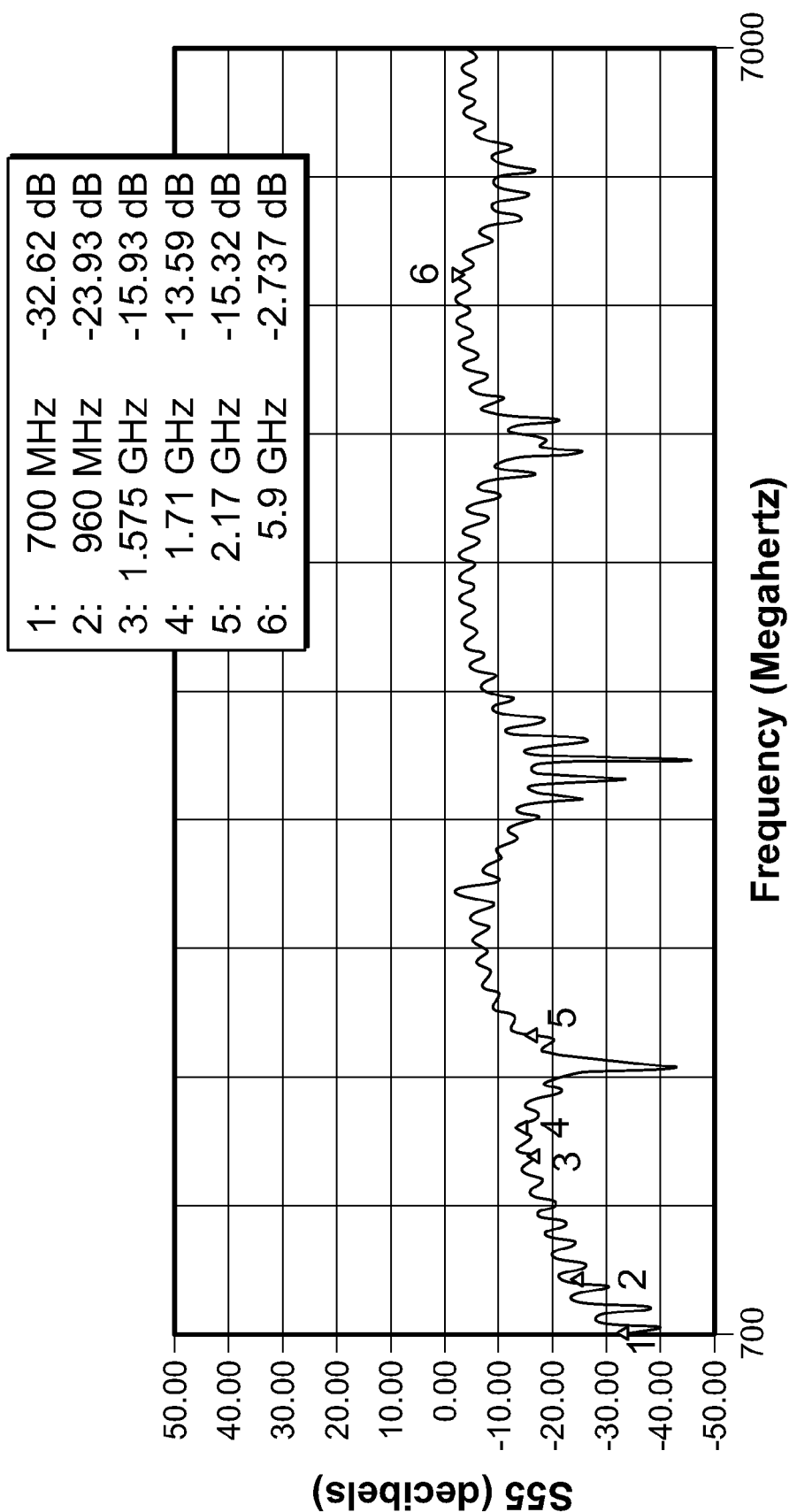
Figure 11:
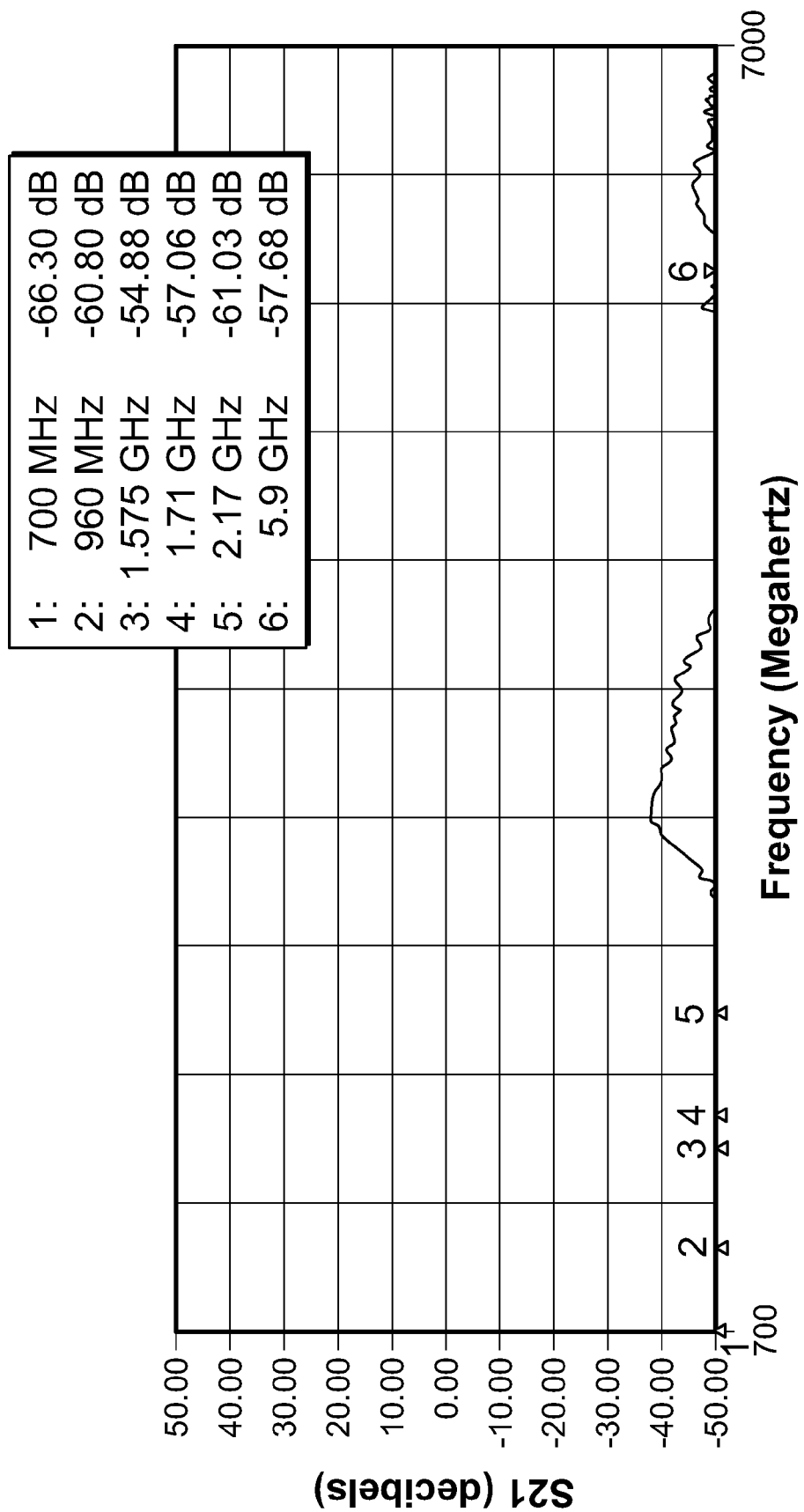

The antenna assembly 100 may also include other components and features similar or identical in structure and/or operation as the corresponding features of the antenna assembly 100 shown in FIGS. 9 through 11 of PCT application WO 2013/090783. The entire contents of PCT application WO 2013/090783 is incorporated herein by reference.

For example, the antenna assembly 100 may include gaskets coupled to the bottom of the chassis 124 to help ensure that the chassis 124 will be grounded to a vehicle roof and also allow the antenna assembly 100 to be used with different roof curvatures. The gaskets may include electrically-conductive fingers (e.g., metallic or metal spring fingers, etc.). In an exemplary embodiment, the gaskets comprise fingerstock gaskets from Laird Technologies, Inc.

The antenna assembly 100 also includes a radome or cover 156 (FIG. 3). As shown in FIG. 3, the cover 156 is configured to fit over the DSRC antenna 104, first and second cellular antennas 108, 112, and first and second patch antennas 116, 120 such that the antennas 104, 108, 112, 116, 120 are co-located under the cover 156.

The cover 156 is configured to be secured to the chassis 124. In this illustrated embodiment, the cover 156 is secured to the chassis 124 by mechanical fasteners 125 (e.g., screws, etc.). Alternatively, the cover 156 may secure to the chassis 124 via any suitable operation, for example, a snap fit connection, mechanical fasteners (e.g., screws, other fastening devices, etc.), ultrasonic welding, solvent welding, heat staking, latching, bayonet connections, hook connections, integrated fastening features, etc.

The chassis or base 124 may be configured to couple to a roof of a car for installing the antenna assembly 100 to the car. For example, the antenna assembly 100 may be mounted to an automobile roof, hood, trunk (e.g., with an unobstructed view overhead or toward the zenith, etc.) where the mounting surface of the automobile acts as a ground plane for the antenna assembly 100 and improves reception of signals. The relatively large size of the ground plane (e.g., a car roof, etc.) may improve reception of radio signals having generally lower frequencies. Alternatively, the cover 156 may connect directly to the roof of a car within the scope of the present disclosure.

The antenna assembly 100 may include a fastener member (e.g., threaded mounting bolt having a hexagonal head, etc.), a first retention component (e.g., an insulator clip, etc.), and a second retention component (e.g., retaining clip, etc.). The fastener member and retention members may be used to mount the antenna assembly 100 to an automobile roof, hood, trunk (e.g., with an unobstructed view overhead or toward the zenith, etc.).

The antenna assembly 100 may include a sealing member (e.g., an O-ring, a resiliently compressible elastomeric or foam gasket, a PORON microcellular urethane foam gasket, etc.) that will be positioned between the chassis 124 and the roof of a car (or other mounting surface). The sealing member may substantially seal the chassis 124 against the roof and substantially seal the mounting hole in the roof. The antenna assembly 100 may also include a sealing member (e.g., an O-ring, a resiliently compressible elastomeric or foam gasket, caulk, adhesives, other suitable packing or sealing members, etc.) that is positioned between the radome 156 and the chassis 124 for substantially sealing the radome 156 against the chassis 124. The sealing member may be at least partially seated within a groove defined along or by the chassis 124. There may also be sealing members positioned between the radome 156 and the roof of the car (or other mounting surface), which sealing members may be operable as seals against dust, etc. and as a shield support. In some embodiments, sealing may be achieved by one or more integral sealing features rather than with a separate sealing mechanism.

The first and second cellular antennas 108, 112 are positioned relatively close to each other. The antenna assembly 100 may be configured such that there is sufficient de-correlation (e.g., a correlation less than about 25 percent, etc.), sufficiently low coupling, and sufficient isolation (e.g., at least about 15 decibels, etc.) between the cellular antennas 108, 112. Preferably, the first and second cellular antennas 108, 112 are sufficiently de-correlated to allow the first and second cellular antennas 108, 112 to be positioned relatively close to each other and without appreciably degrading performance of the DSRC antenna 104 and/or the patch antennas 116, 120.

The radome 156 may be formed from a wide range of materials, such as, for example, polymers, urethanes, plastic materials (e.g., polycarbonate blends, Polycarbonate-Acrylnitril-Butadien-Styrol-Copolymer (PC/ABS) blend, etc.), glass-reinforced plastic materials, synthetic resin materials, thermoplastic materials (e.g., GE Plastics Geloy® XP4034 Resin, etc.), etc. within the scope of the present disclosure.

The chassis 124 may be formed from materials similar to those used to form the radome 156. For example, the material of the chassis 124 may be formed from one or more alloys, e.g., zinc alloy, etc. Alternatively, the chassis 124 may be formed from plastic, injection molded from polymer, steel, and other materials (including composites) by a suitable forming process, for example, a die cast process, etc. within the scope of the present disclosure.

A sample prototype antenna assembly having features similar to the corresponding features of the antenna assembly 100 (FIGS. 1 through 3) and multiplexer 140 (FIGS. 4 and 5) was constructed and tested. FIGS. 6 through 21 provide analysis results measured for the prototype antenna assembly on a one-meter diameter generally circular ground plane. Generally, these results show that losses in the DSRC system performance are kept at a minimum or very low level, while other functional bands such as LTE and Satellite are not affected. These analysis results shown in FIGS. 6 through 21 are provided only for purposes of illustration and not for purposes of limitation. Alternative embodiments of the antenna assembly may be configured differently and have different operational or performance parameters than what is shown in FIGS. 6 through 21.

Figure 6:
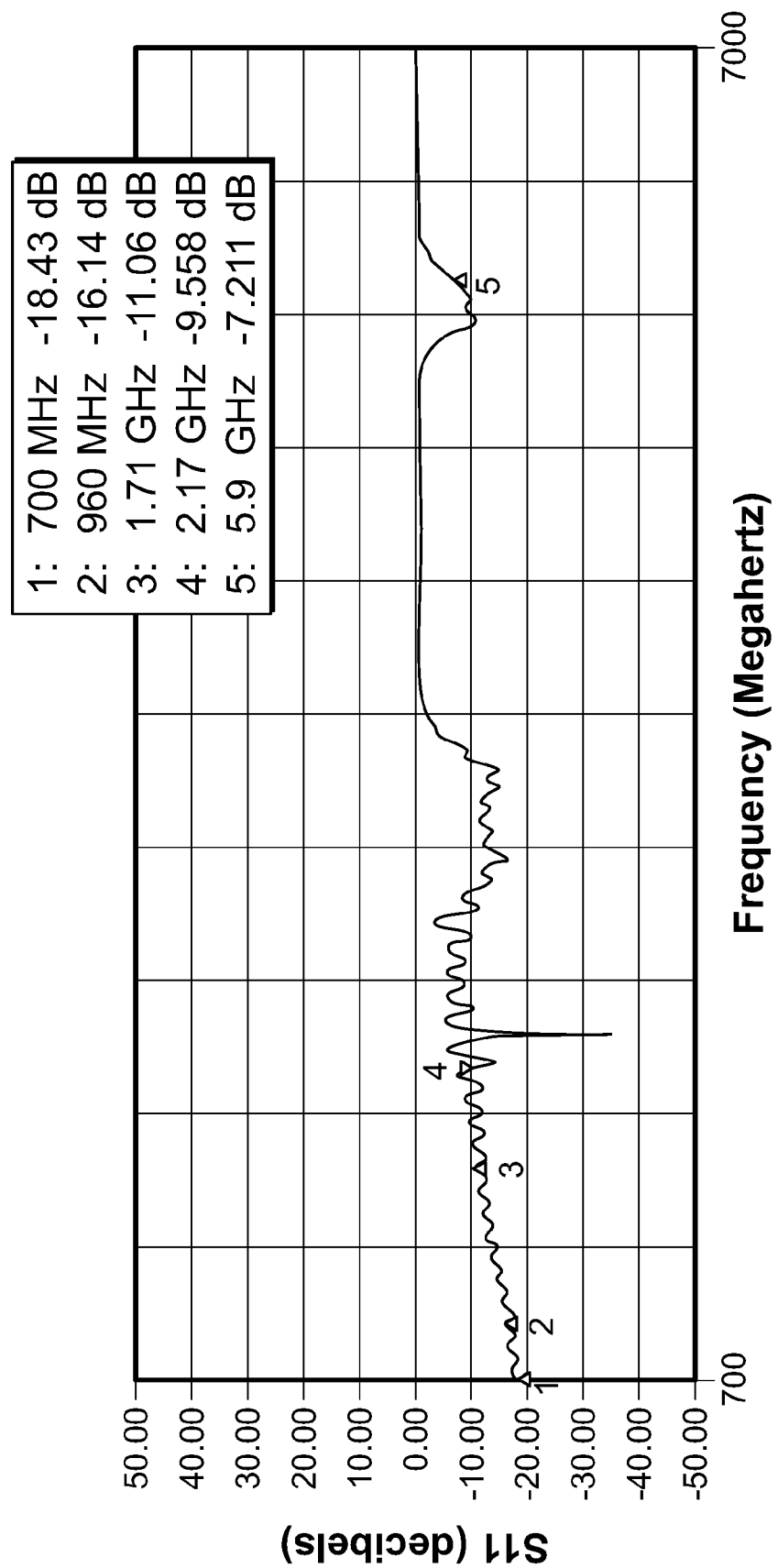
Figure 7:
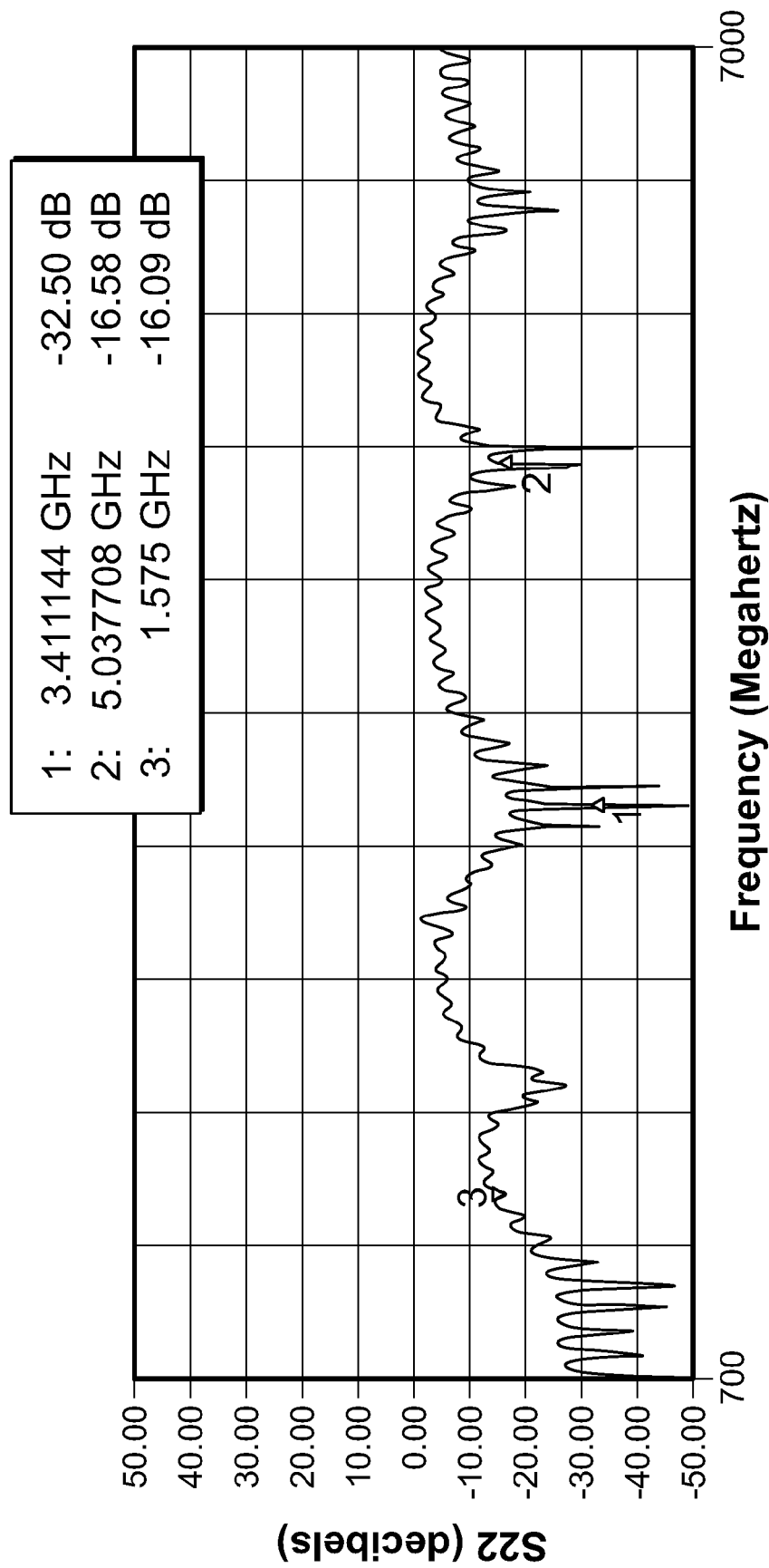
Figure 8:
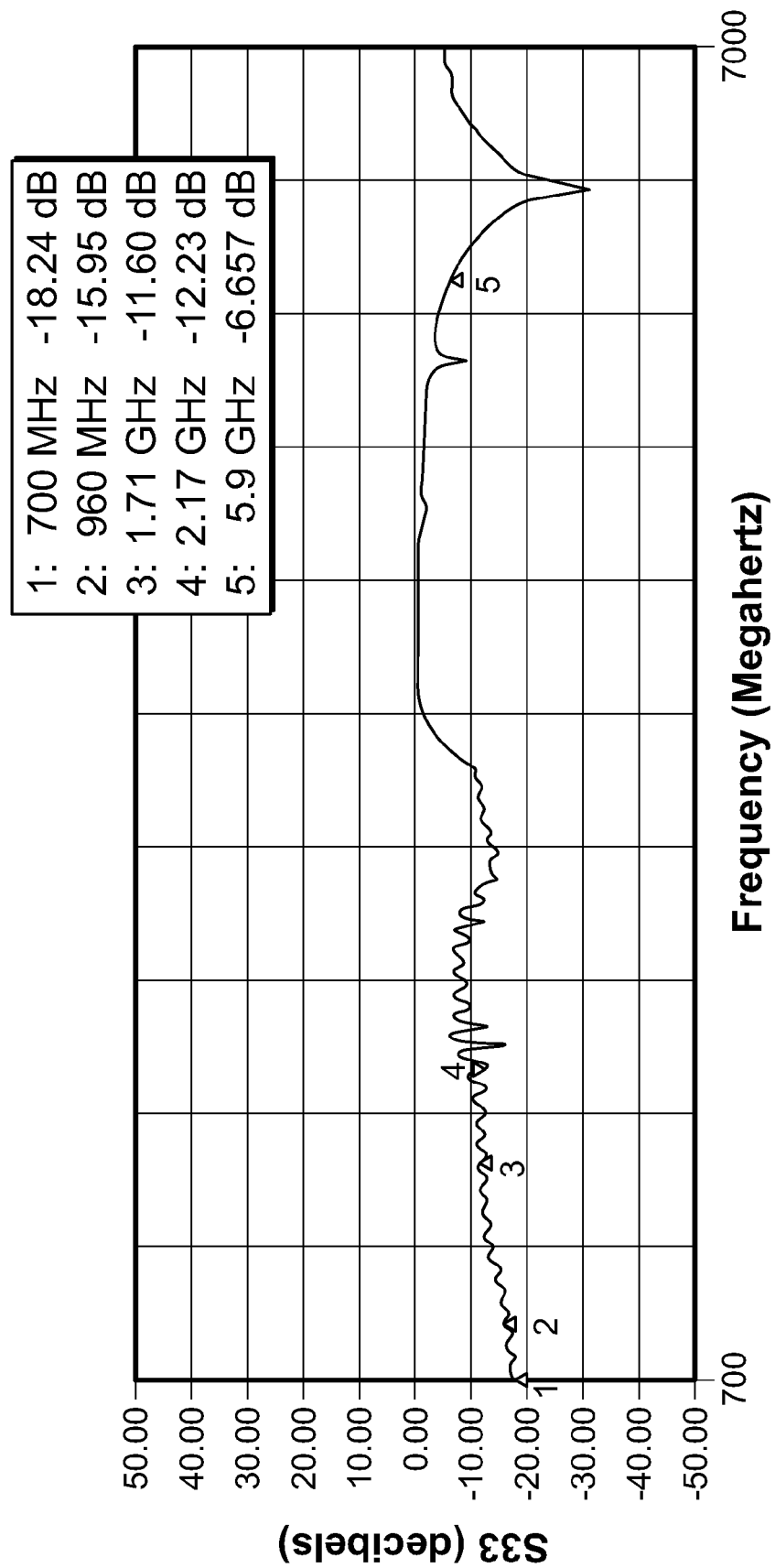

FIGS. 6, 7, 8, 9, and 10 are line graphs of measured reflection or matching S11, S22, S33, S44, and S55 in decibels versus frequency in megahertz for the prototype of the antenna assembly 100 including the multiplexer 140. More specifically, and with reference to FIGS. 1 and 5, the line graph of FIG. 6 is measured reflection or matching S11 for the cellular signals and DSRC signals from the primary cellular antenna 108 and DSRC antenna 104, respectively, that are received at or by first port 141. FIG. 7 is a line graph of measured reflection or matching S22 for the cellular signals and GNSS signals from the second cellular antenna 112 and patch antenna 116, respectively, that are received at or by second port 143. FIG. 8 is a line graph of measured reflection or matching S33 for the cellular signals from the first cellular antenna 108 that are output from or by the third port 145, e.g., to Telematics Control Unit (TCU) box, etc. FIG. 9 is a line graph of measured reflection or matching S44 for the DSRC signals and GNSS signals from the DSRC antenna 104 and patch antenna 116, respectively, that are output from the fourth port 147, e.g., to DSRC box, etc. FIG. 10 is a line graph of measured reflection or matching S55 for the cellular signals and GNSS signals from the second cellular antenna 112 and patch antenna 116, respectively, that are output from the fifth port 149, e.g., to Telematics Control Unit (TCU) box, etc. Generally, FIGS. 6 through 10 show that the prototype antenna assembly had good return loss at each band of operation.

Figure 14:
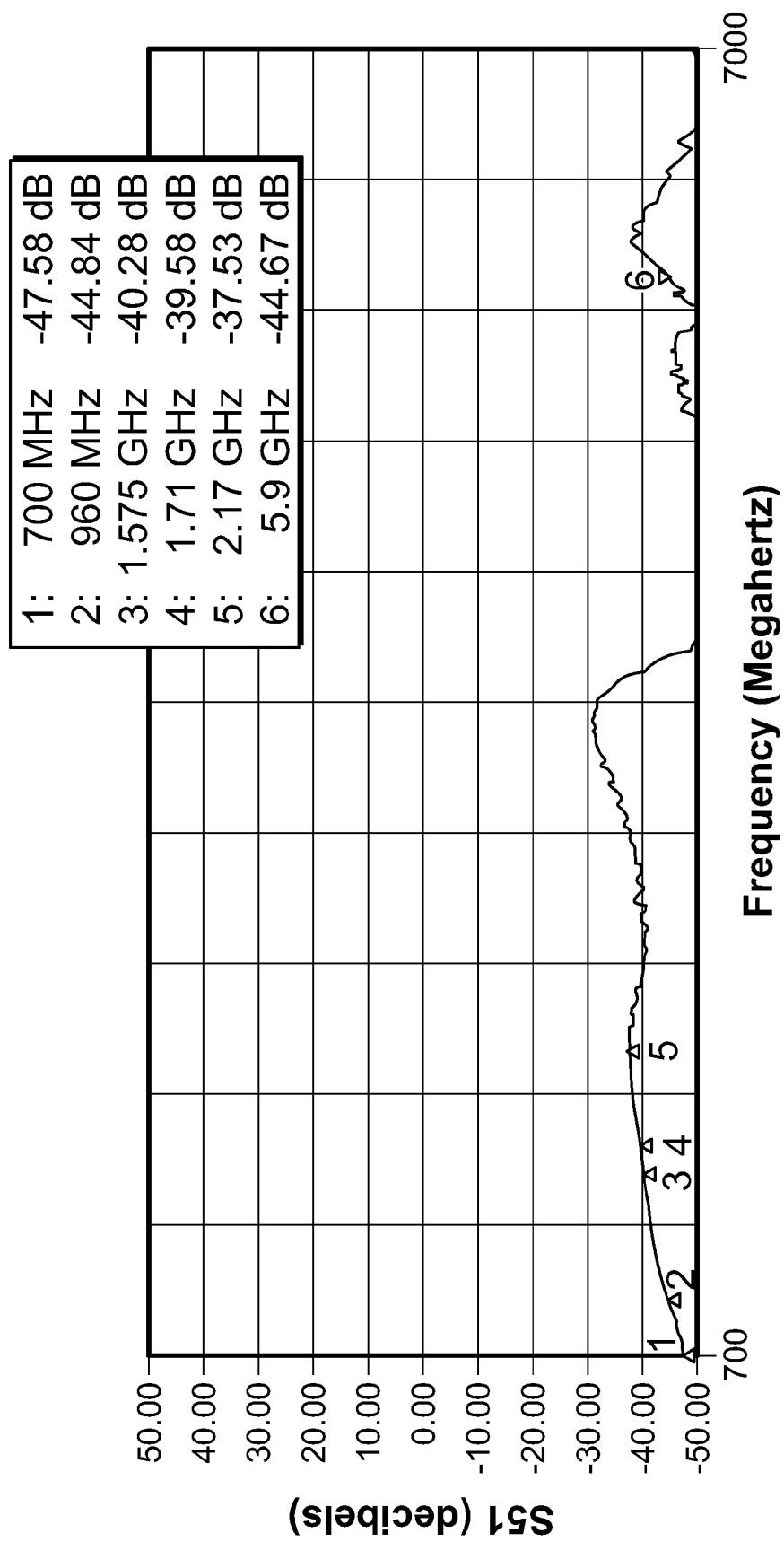
Figure 15:
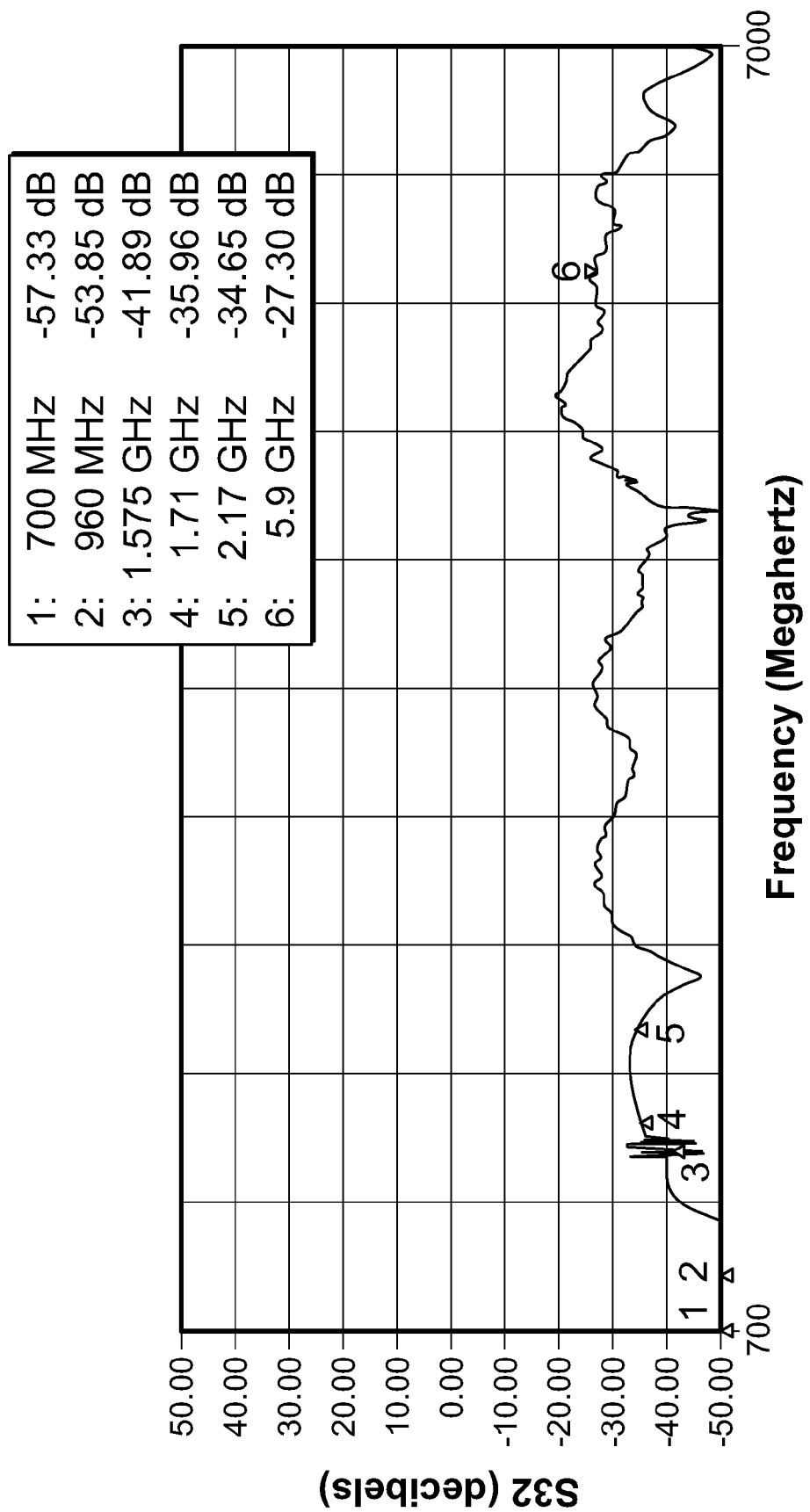
Figure 16:
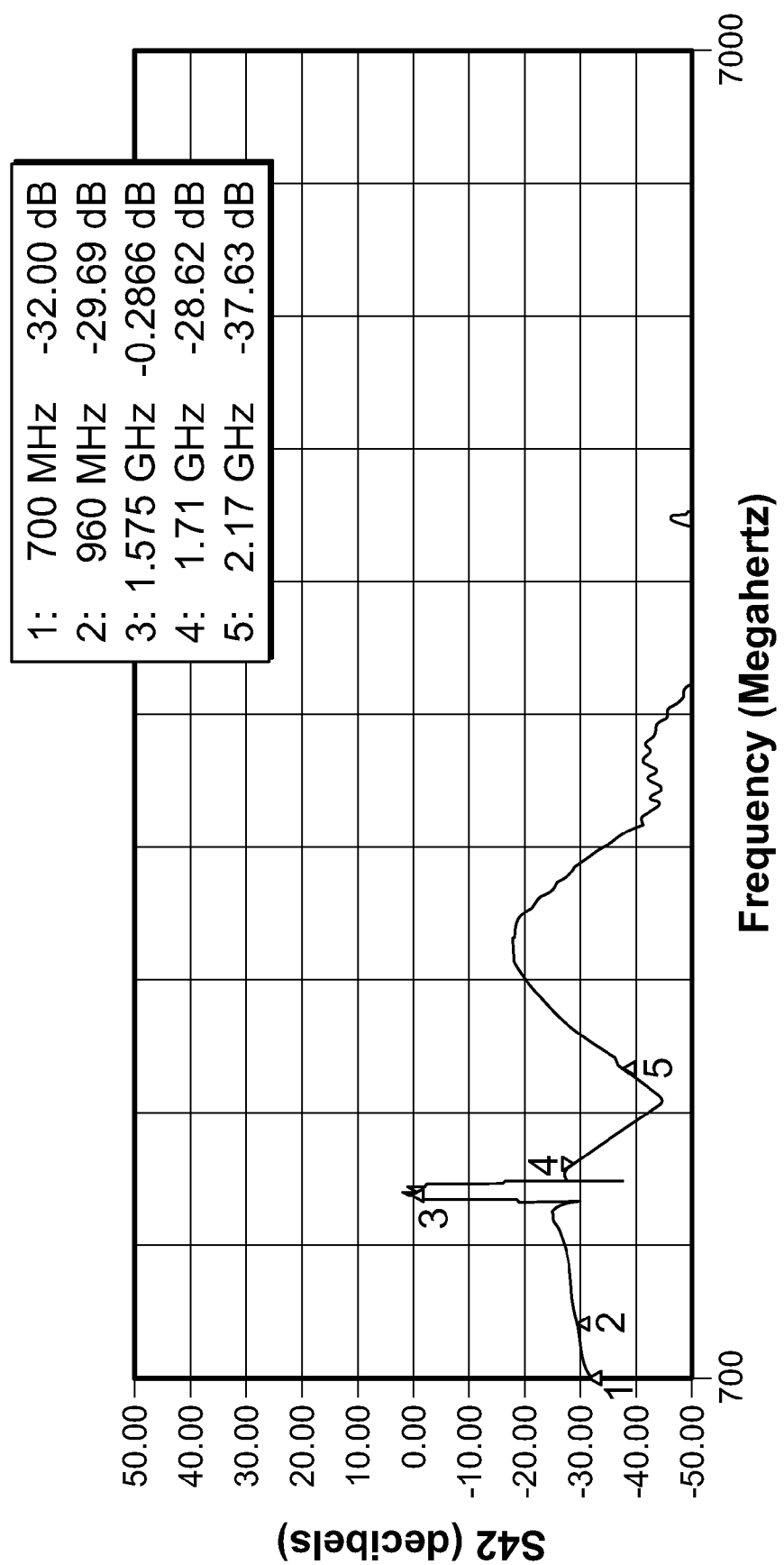
Figure 18:
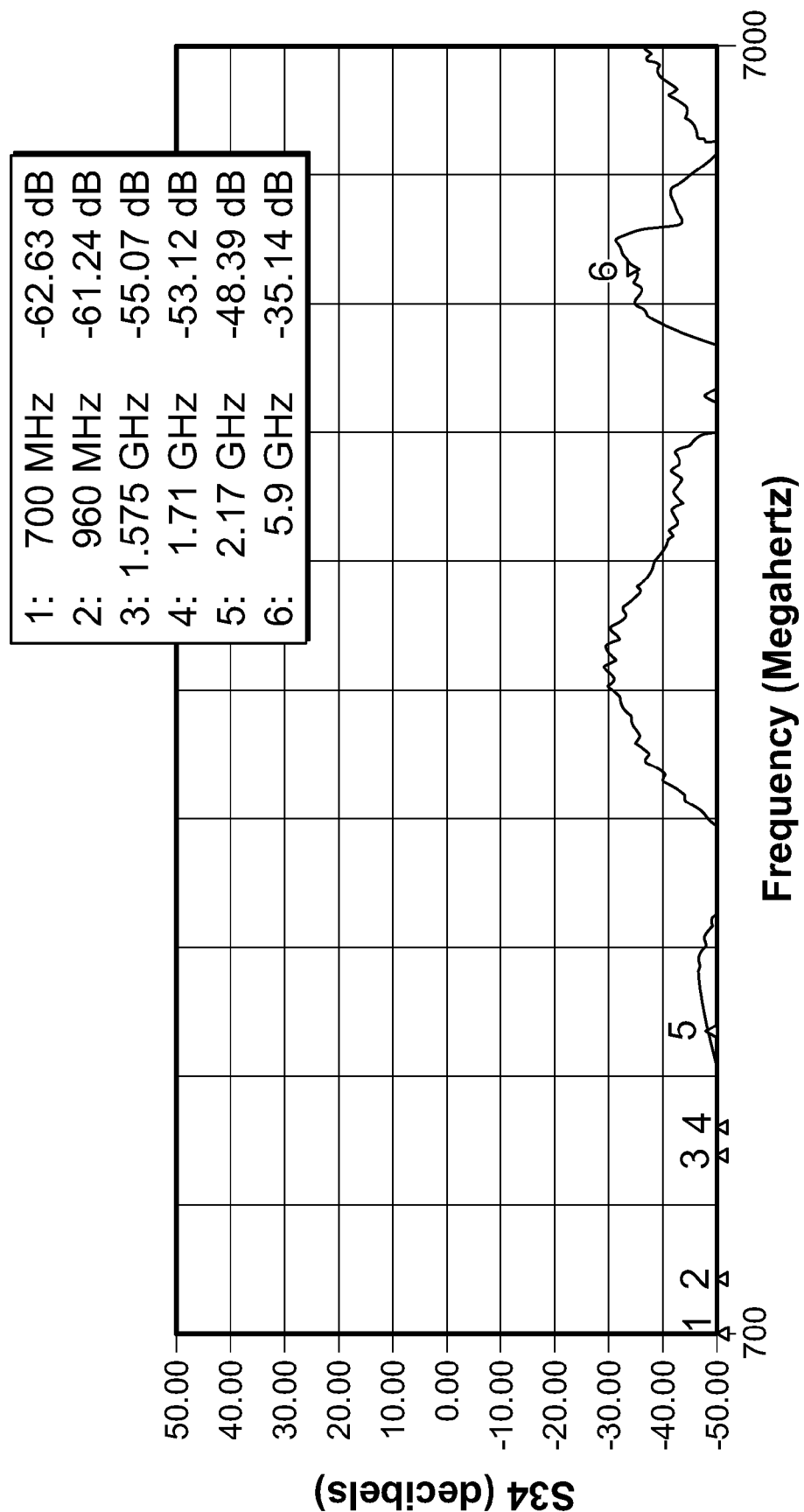
Figure 19:
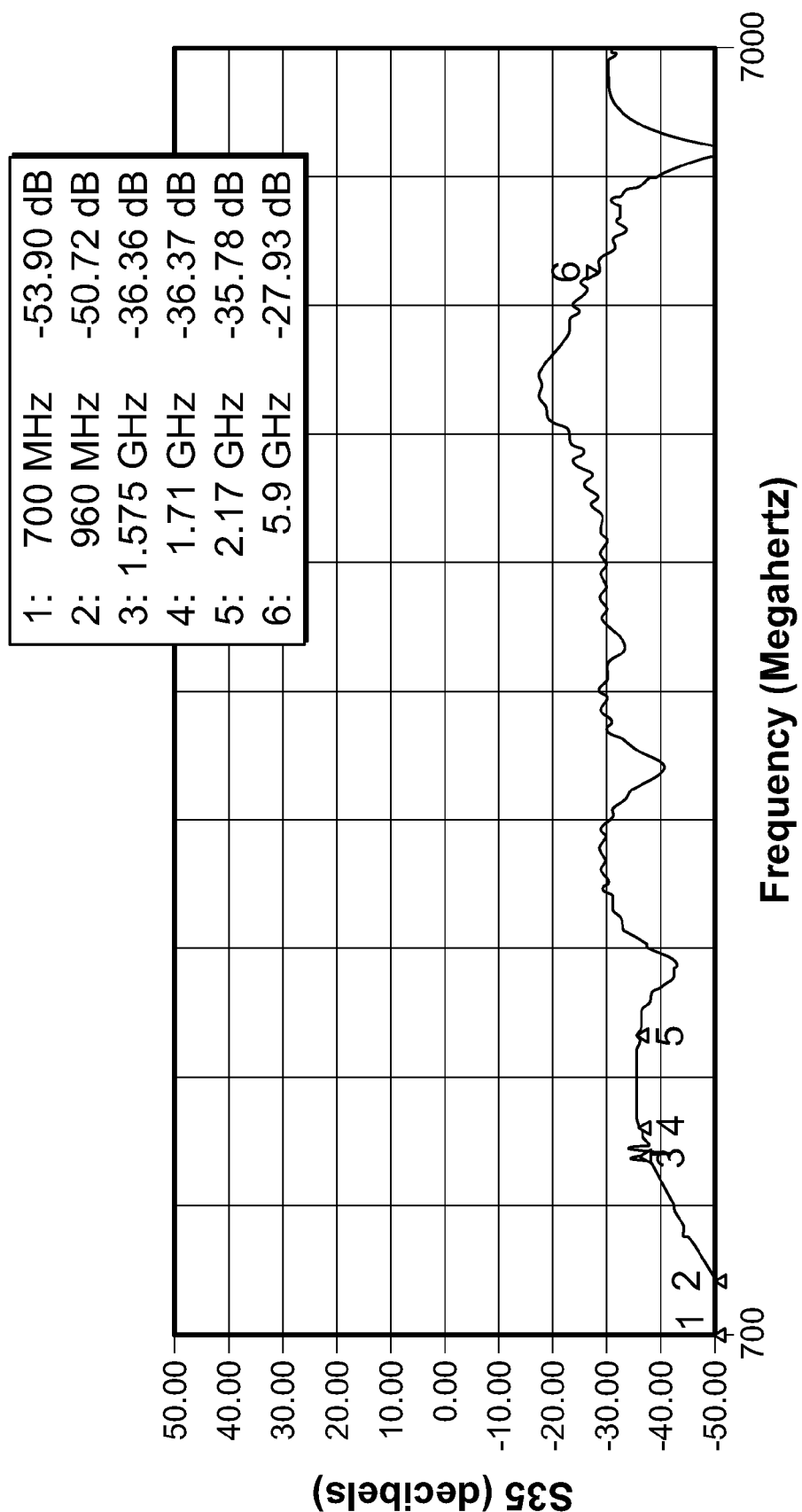
Figure 20:
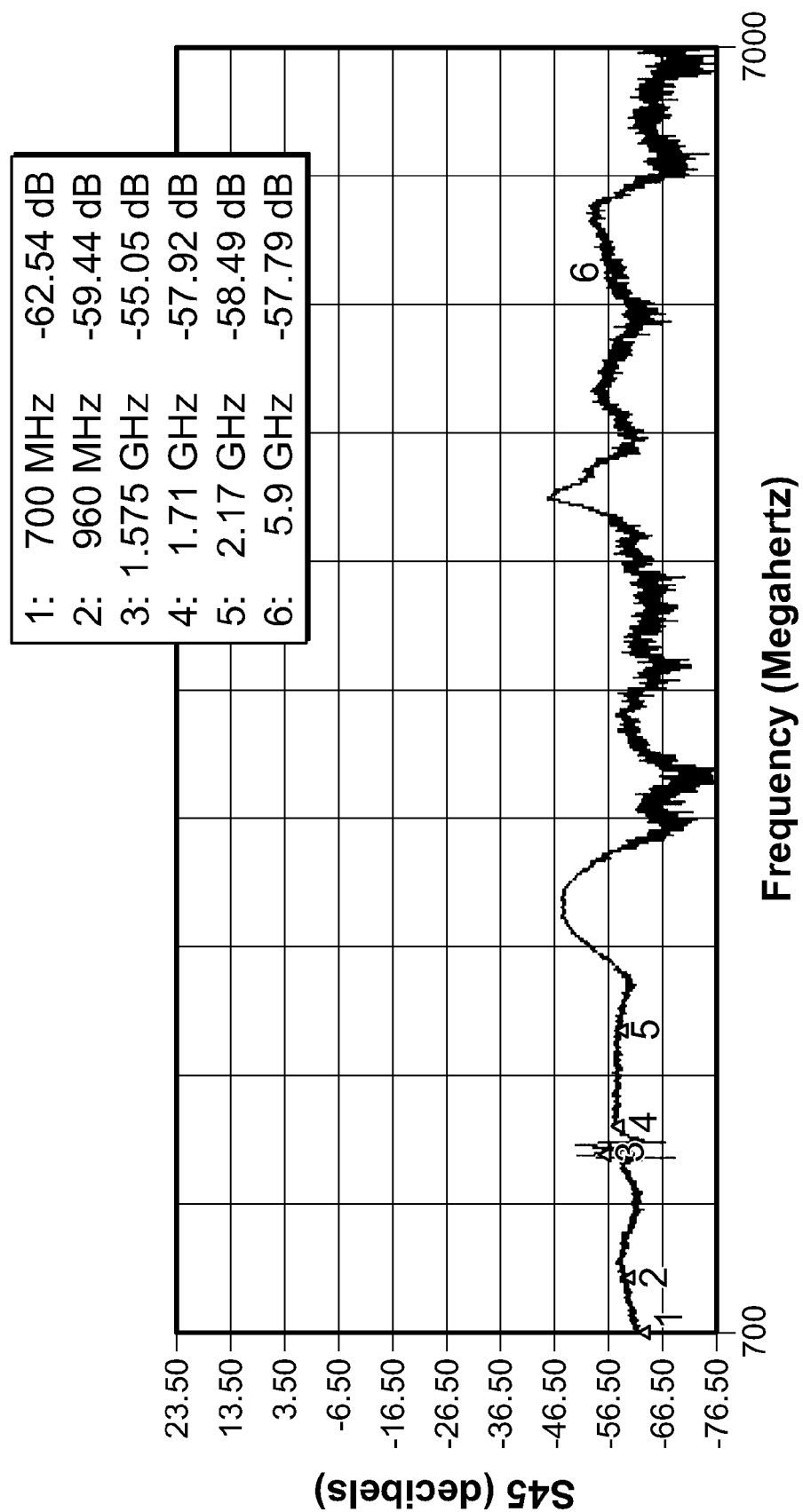

FIGS. 11, 14, 15, 16, 18, 19, and 20 are line graphs of measured isolation S21, S51, S32, S42, S34, S35, and S45, respectively, in decibels versus frequency in megahertz for the prototype of the antenna assembly 100 including the multiplexer 140. More specifically, FIG. 11 is a line graph of measured isolation S21 of the cellular signals and DSRC signals from the respective first cellular antenna 108 and DSRC antenna 104 relative to the cellular signals and GNSS signals from the second cellular antenna 112 and patch antenna 116, respectively. FIG. 14 is a line graph of measured isolation S51 of the cellular signals and DSRC signals from the respective first cellular antenna 108 and DSRC antenna 104 relative to the cellular signals and GNSS signals from the second cellular antenna 112 and patch antenna 116, respectively, that are output from the fifth port 149, e.g., to Telematics Control Unit (TCU) box, etc. FIG. 15 is a line graph of measured isolation S32 of the cellular signals and GNSS signals from the respective second cellular antenna 112 and patch antenna 116 relative to the cellular signals from the first cellular antenna 108 that are output from the third port 145, e.g., to Telematics Control Unit (TCU) box, etc. FIG. 16 is a line graph of measured isolation S42 of the cellular signals and GNSS signals from the respective second cellular antenna 112 and patch antenna 116 relative to the DSRC signals and GNSS signals from the DSRC antenna 104 and patch antenna 116, respectively, that are output from the fourth port 147, e.g., to DSRC box, etc. FIG. 18 is a line graph of measured isolation S34 of the cellular signals from the first cellular antenna 108 that are output from the third port 145 (e.g., to DSRC box, etc.) relative to the DSRC signals and GNSS signals from the respective DSRC antenna 104 and patch antenna 116 that are output from the fourth port 147, e.g., to DSRC box, etc. FIG. 19 is a line graph of measured isolation S35 of the cellular signals from the first cellular antenna 108 that are output from the third port 145 (e.g., to DSRC box, etc.) relative to the cellular signals and GNSS signals from the respective second cellular antenna 112 and patch antenna 116 that are output from the fifth port 149, e.g., to Telematics Control Unit (TCU) box, etc. FIG. 20 is a line graph of measured isolation S45 of the DSRC signals and GNSS signals from the respective DSRC antenna 104 and patch antenna 116 that are output from the fourth port 147 (e.g., to DSRC box, etc.) relative to the cellular signals and GNSS signals from the respective second cellular antenna 112 and patch antenna 116 that are output from the fifth port 149, e.g., to Telematics Control Unit (TCU) box, etc. Generally, FIGS. 11, 14, 15, 16, 18, 19, and 20 show that the prototype antenna assembly had good isolation for the different bands for simultaneous operation, especially between the satellite signals and cell/DSRC signals.

FIGS. 12, 13, and 17 are line graphs of measured insertion loss S31, S41, and S52, respectively, in decibels versus frequency in megahertz for the prototype of the antenna assembly 100 including the multiplexer 140. More specifically, FIG. 12 is a line graph of measured isolation S31 of the cellular signals and DSRC signals from the respective first cellular antenna 108 and DSRC antenna 104 relative to the cellular signals from the first cellular antenna 108 that are output from the third port 145, e.g., to Telematics Control Unit (TCU) box, etc. FIG. 13 is a line graph of measured isolation S41 of the cellular signals and DSRC signals from the respective first cellular antenna 108 and DSRC antenna 104 relative to the DSRC signals and GNSS signals from the respectively DSRC antenna 104 and patch antenna 116 that are output from the fourth port 147, e.g., to DSRC box, etc. FIG. 17 is a line graph of measured isolation S52 of the cellular signals and GNSS signals from the respective second cellular antenna 112 and patch antenna 116 relative to the cellular signals and GNSS signals from the respective second cellular antenna 112 and patch antenna 116 that are output from the fifth port 149, e.g., to Telematics Control Unit (TCU) box, etc. Generally, FIGS. 12, 13, and 17 show that the prototype antenna assembly had good insertion loss at the different bands of operation, especially at the high frequency DSRC band.

FIG. 21 includes line graphs of linear average gain in decibels-isotropic (dBi) versus frequency megahertz (MHz) for the DSRC antenna 104 of the prototype antenna assembly shown in FIGS. 1 through 3, where the antenna gain was measured at the end of a pigtail and with the prototype on a one-meter diameter generally circular ground plane at DSRC frequencies of 5850 MHz, 5875 MHz, 5900 MHz, and 5925 MHz. Generally, FIG. 21 shows that the prototype antenna assembly had good linear average gain and relatively good omnidirectionality within the DSRC frequency bandwidth.

Exemplary embodiments of the antenna assemblies disclosed herein may be configured for use as a multiband multiple input multiple output (MIMO) antenna assembly that is operable in multiple frequency bands including the DSRC (Dedicated Short Range Communication) and one or more frequency bandwidths associated with cellular communications, Wi-Fi, satellite signals, and/or terrestrial signals, etc. For example, exemplary embodiments of antenna assemblies disclosed herein may be operable in a DSRC frequency band (e.g., 5.9 GHz band from 5850 MHz to 5925 MHz, etc.) and one or more or any combination (or all) of the following frequency bands: amplitude modulation (AM), frequency modulation (FM), global navigation satellite system (GNSS) (e.g., global positioning system (GPS), European Galileo system, the Russian GLONASS, the Chinese Beidou navigation system, the Indian IRNSS, etc.), satellite digital audio radio services (SDARS) (e.g., Telematics Control Unit (TCU), Sirius XM Satellite Radio, etc.), AMPS, GSM850, GSM900, PCS, GSM1800, GSM1900, AWS, UMTS, digital audio broadcasting (DAB)-VHF-III, DAB-L, Long Term Evolution (e.g., 4G, 3G, other LTE generation, B17 (LTE), LTE (700 MHz), etc.), Wi-Fi, Wi-Max, PCS, EBS (Educational Broadband Services), WCS (Broadband Wireless Communication Services/Internet Services), cellular frequency bandwidth(s) associated with or unique to a particular one or more geographic regions or countries, one or more frequency bandwidth(s) from Table 1 and/or Table 2 below, etc.

TABLE 1

| System/Band Description | Upper Frequency (MHz) | Lower Frequency (MHz) |
| --- | --- | --- |
| 700 MHz Band | 698 | 862 |
| B17 (LTE) | 704 | 787 |
| AMPS/GSM850 | 824 | 894 |
| GSM 900 (E-GSM) | 880 | 960 |
| DCS 1800/GSM1800 | 1710 | 1880 |
| PCS/GSM1900 | 1850 | 1990 |
| W CD MA/UMTS | 1920 | 2170 |
| IEEE 802.11 B/G | 2400 | 2500 |
| EBS/BRS | 2496 | 2690 |
| WiMAX MMDS | 2500 | 2690 |
| W IMAX (3.5 GHz) | 3400 | 3600 |
| PUBLIC SAFETY RADIO | 4940 | 4990 |

TABLE 2

| Band | Tx/Uplink (MHz) | | Rx/Downlink (MHz) | |
| --- | --- | --- | --- | --- |
| | Start | Stop | Start | Stop |
| GSM 850/AMP | 824.00 | 849.00 | 869.00 | 894.00 |
| GSM 900 | 876.00 | 914.80 | 915.40 | 959.80 |
| AWS | 1710.00 | 1755.80 | 2214.00 | 2180.00 |
| GSM 1800 | 1710.20 | 1784.80 | 1805.20 | 1879.80 |
| GSM 1900 | 1850.00 | 1910.00 | 1930.00 | 1990.00 |
| UMTS | 1920.00 | 1980.00 | 2110.00 | 2170.00 |
| LTE | 2010.00 | 2025.00 | 2010.00 | 2025.00 |
| LTE | 2300.00 | 2400.00 | 2300.00 | 2400.00 |
| LTE | 2496.00 | 2690.00 | 2496.00 | 2690.00 |
| LTE | 2545.00 | 2575.00 | 2545.00 | 2575.00 |
| LTE | 2570.00 | 2620.00 | 2570.00 | 2620.00 |

Advantageously, exemplary embodiments disclosed herein may thus provide cost-effective DSRC capabilities integration into existing antenna modules where DSRC output is combined in an existing antenna cable, e.g., primary cellular antenna cable. Exemplary embodiments may offer versatility to customers and car makers, e.g., a customer may be provided the option to integrate DSRC at the dealer level. In exemplary embodiments, a DSRC antenna is integrated into an existing roof-mount multiband (e.g., quadband with dual-band cellular, GNSS, and SDARS, etc.) antenna assembly such that the existing antenna functionality, styling, footprint or attachment scheme is not affected or required by adding the DSRC functionality.

In addition, various antenna assemblies (e.g., 100, etc.) disclosed herein may be mounted to a wide range of supporting structures, including stationary platforms and mobile platforms. For example, an antenna assembly (e.g., 100, etc.) disclosed herein could be mounted to a supporting structure of a bus, train, aircraft, bicycle, motor cycle, boat, among other mobile platforms. Accordingly, the specific references to motor vehicles or automobiles herein should not be construed as limiting the scope of the present disclosure to any specific type of supporting structure or environment.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multiband multiple input multiple output (MIMO) vehicular antenna assembly for installation to a vehicle body wall, the antenna assembly comprising:
    at least one cellular antenna configured to be operable over one or more cellular frequencies;
    a dual monopole antenna configured to be operable over Dedicated Short Range Communication (DSRC) frequencies, the dual monopole antenna including:
        an isolator configured to provide isolation between the dual monopole antenna and the at least one cellular antenna; and
        first and second DSRC antenna elements spaced apart from each other and disposed along opposite sides of the isolator.

2. The multiband MIMO vehicular antenna assembly of claim 1, further comprising:
    a first circuit board connected to and/or supporting the at least one cellular antenna; and
    a second circuit board above the first circuit board, the second circuit board connected to and/or supporting the dual monopole antenna.

3. The multiband MIMO vehicular antenna assembly of claim 1, further comprising at least one satellite antenna configured to be operable over one or more satellite frequencies.

4. The multiband MIMO vehicular antenna assembly of claim 3:
    wherein the at least one cellular antenna comprises first and second cellular antennas, the first cellular antenna configured to be operable for receiving and transmitting Long Term Evolution (LTE) signals, the second cellular antenna configured to be operable for only receiving, and is inoperable for transmitting, LTE signals;
    wherein the at least one satellite antenna comprises first and second patch antennas, the first patch antenna configured to be operable for receiving Global Navigation Satellite System (GNSS) signals, the second patch antenna configured to be operable for receiving satellite digital audio radio services (SDARS) signals;
wherein the antenna assembly further comprises:
a chassis;
a radome coupled to the chassis such that an interior enclosure is collectively defined by the radome and the chassis, the dual monopole antenna, the first and second cellular antennas, and the first and second patch antennas are disposed within the interior enclosure;
a first circuit board coupled to and/or supported by the chassis, the first circuit board connected to and/or supporting the first and second cellular antennas and the first and second patch antennas; and
a second circuit board coupled to and/or supported by the first circuit board, the second circuit board connected to and/or supporting the dual monopole antenna;
whereby the antenna assembly is configured to be installed and fixedly mounted to a vehicle body wall after being inserted into a mounting hole in the vehicle body wall from an external side of the vehicle and nipped from an interior compartment side of the vehicle.

5. The multiband MIMO vehicular antenna assembly of claim 1, wherein the antenna assembly is configured such that an output of the dual monopole antenna is on a same transmission line as at least one other antenna output.

6. The multiband MIMO vehicular antenna assembly of claim 1, wherein:
the at least one cellular antenna comprises a first cellular antenna configured to be operable for receiving and transmitting cellular signals; and
the antenna assembly is configured such that an output of the dual monopole antenna is combined and fed through an output of the first cellular antenna via coupling.

7. The multiband MIMO vehicular antenna assembly of claim 6, further comprising a first transmission line for carrying DSRC signals output by the dual monopole antenna and cellular signals output by the first cellular antenna.

8. The multiband MIMO vehicular antenna assembly of claim 7, wherein:
the at least one cellular antenna further comprises a second cellular antenna configured to be operable for only receiving, and is inoperable for transmitting, cellular signals;
the antenna assembly includes a first satellite antenna configured to be operable for receiving Global Navigation Satellite System (GNSS) signals; and
the antenna assembly further comprises a second transmission line for carrying cellular signals output by the second cellular antenna and GNSS signals output by the first satellite antenna.

9. The multiband MIMO vehicular antenna assembly of claim 8, further comprising a multiplexer having first and second ports to which the first and second transmission lines are respectively routed, and wherein:
the first port is configured to receive DSRC signals and cellular signals carried by the first transmission line; and
the second port is configured to receive cellular signals and GNSS signals carried by the second transmission line.

10. The multiband MIMO vehicular antenna assembly of claim 9, wherein the multiplexer further comprises:
a third port configured to output cellular signals received by the first cellular antenna;
a fourth port configured to output DSRC signals and GNSS signals; and
a fifth port configured to output cellular signals received by the second cellular antenna and DSRC signals.

11. The multiband MIMO vehicular antenna assembly of claim 10, wherein the multiplexer further comprises:
a diplexer;
a bandpass filter;
an amplifier coupled to the diplexer and the bandpass filter;
an extractor filter coupled to the first port and the third port, the extractor filter operable for separating DSRC signals from cellular signals, such that the separated cellular signals and DSRC signals respectively pass to the third port and the diplexer;
a directional coupler coupled to the second port, the fifth port, and the bandpass filter, such that GNSS signals and cellular signals received at the directional coupler from the second port are transmitted to the fifth port and the bandpass filter;
wherein:
the bandpass filter is operable to permit GNSS signals to pass therethrough and prevent passage of cellular signals;
the amplifier is operable for amplifying GNSS signals received from the bandpass filter; and
the diplexer is operable for multiplexing DSRC signals from the first port and GNSS signals from the second port onto the fourth port.

12. The multiband MIMO vehicular antenna assembly of claim 11, further comprising a radio unit for DSRC that includes a tuner, a baseband process, a microcontroller, and an output system.

13. A multiband multiple input multiple output (MIMO) vehicular antenna assembly for installation to a vehicle body wall, the antenna assembly comprising:
at least one Dedicated Short Range Communication (DSRC) antenna configured to be operable over DSRC frequencies;
at least one other antenna;
a first circuit board connected to and/or supporting the at least one other antenna; and
a second circuit board coupled to and/or supported by the first circuit board, the second circuit board connected to and/or supporting the at least one DSRC antenna;
wherein the at least one other antenna comprises:
first and second cellular antennas connected to and/or supported by the first circuit board, the first cellular antenna configured to be operable for receiving and transmitting Long Term Evolution (LTE) signals, the second cellular antenna configured to be operable for only receiving, and is inoperable for transmitting, LTE signals; and
first and second patch antennas connected to and/or supported by the first circuit board, the first patch antenna configured to be operable for receiving Global Navigation Satellite System (GNSS) signals, the second patch antenna configured to be operable for receiving satellite digital audio radio services (SDARS) signals;
wherein the antenna assembly further comprises a chassis and a radome coupled to the chassis such that an interior enclosure is collectively defined by the radome and the chassis, the DSRC antenna, the first and second cellular antennas, and the first and second patch antennas are disposed within the interior enclosure;
wherein the first circuit board is coupled to and/or supported by the chassis; and
whereby the antenna assembly is configured to be installed and fixedly mounted to a vehicle body wall after being inserted into a mounting hole in the vehicle body wall from an external side of the vehicle and nipped from an interior compartment side of the vehicle.

14. The multiband MIMO vehicular antenna assembly of claim 13, wherein:
the first circuit board comprise FR4 glass-reinforced epoxy laminate; and
the second circuit board comprises a woven fiberglass polytetrafluoroethylene (PTFE) composite material or other low-loss tangent high frequency substrate material.

15. The multiband MIMO vehicular antenna assembly of claim 13, wherein the antenna assembly is configured such that an output of the DSRC antenna is on a same transmission line as at least one other antenna output.

16. The multiband MIMO vehicular antenna assembly of claim 13, wherein the at least one other antenna comprises:
at least one satellite antenna configured to be operable over one or more satellite frequencies; and/or
at least one cellular antenna configured to be operable over one or more cellular frequencies.

17. A multiband multiple input multiple output (MIMO) vehicular antenna assembly for installation to a vehicle body wall, the antenna assembly comprising:
at least one Dedicated Short Range Communication (DSRC) antenna configured to be operable over DSRC frequencies; and
at least one cellular antenna;
wherein the antenna assembly is configured such that an output of the at least one DSRC antenna is combined and fed through an output of the at least one cellular antenna via coupling whereby the DSRC signals and signals from the at least one cellular antenna may be carried by the same transmission line.

18. The multiband MIMO vehicular antenna assembly of claim 17, wherein the at least one cellular antenna is configured to be operable over one or more cellular frequencies.

19. The multiband MIMO vehicular assembly of claim 18, further comprising:
a first circuit board connected to and/or supporting the at least one cellular antenna; and
a second circuit board coupled to and/or supported by the first circuit board, the second circuit board connected to and/or supporting the at least one DSRC antenna.

20. The multiband MIMO vehicular antenna assembly of claim 18, wherein:
the antenna assembly further comprises at least one satellite antenna configured to be operable over one or more satellite frequencies; and/or
the at least one DSRC antenna comprises a dual monopole antenna.

21. The multiband MIMO vehicular antenna assembly of claim 18, wherein:
the at least one cellular antenna comprises a first cellular antenna configured to be operable for receiving and transmitting cellular signals;
the antenna assembly is configured such that an output of the at least one DSRC antenna is combined and fed through an output of the first cellular antenna via coupling; and
the antenna assembly further comprises a first transmission line for carrying DSRC signals and cellular signals respectively output by the at least one DSRC antenna and the first cellular antenna.

22. The multiband MIMO vehicular antenna assembly of claim 21, wherein:
the at least one cellular antenna further comprises a second cellular antenna configured to be operable for only receiving, and is inoperable for transmitting, cellular signals;
the antenna assembly includes a first satellite antenna configured to be operable for receiving Global Navigation Satellite System (GNSS) signals; and
the antenna assembly further comprises a multiplexer and a second transmission line for carrying cellular signals output by the second cellular antenna and GNSS signals output by the first satellite antenna;
the multiplexer comprising:
a first port configured to receive DSRC signals and cellular signals carried by the first transmission line;
a second port configured to receive cellular signals and GNSS signals carried by the second transmission line;
a third port configured to output cellular signals received by the first cellular antenna;
a fourth port configured to output DSRC signals and GNSS signals; and
a fifth port configured to output cellular signals received by the second cellular antenna and DSRC signals.

23. The multiband MIMO vehicular antenna assembly of claim 22, wherein the multiplexer further comprises:
a diplexer;
a bandpass filter;
an amplifier coupled to the diplexer and the bandpass filter;
an extractor filter coupled to the first port and the third port, the extractor filter operable for separating DSRC signals from cellular signals, such that the separated cellular signals and DSRC signals respectively pass to the third port and the diplexer; and
a directional coupler coupled to the second port, the fifth port, and the bandpass filter, such that GNSS signals and cellular signals received at the directional coupler from the second port are transmitted to the fifth port and the bandpass filter;
wherein:
the bandpass filter is operable to permit GNSS signals to pass therethrough and prevent passage of cellular signals;
the amplifier is operable for amplifying GNSS signals received from the bandpass filter; and
the diplexer is operable for multiplexing DSRC signals from the first port and GNSS signals from the second port onto the fourth port.

* * * * *